United States Patent
Ono

(10) Patent No.: US 9,659,376 B2
(45) Date of Patent: May 23, 2017

(54) FILTERING DEVICE

(71) Applicant: Fuji Jukogyo Kabushiki Kaisha, Tokyo (JP)

(72) Inventor: Hiroyuki Ono, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 105 days.

(21) Appl. No.: 14/478,966

(22) Filed: Sep. 5, 2014

(65) Prior Publication Data

US 2015/0092990 A1 Apr. 2, 2015

(30) Foreign Application Priority Data

Sep. 30, 2013 (JP) ................................ 2013-205392

(51) Int. Cl.
*G06K 9/00* (2006.01)
*G06T 7/00* (2017.01)
*G06K 9/62* (2006.01)
*G06T 7/593* (2017.01)

(52) U.S. Cl.
CPC .......... *G06T 7/004* (2013.01); *G06K 9/00791* (2013.01); *G06K 9/00805* (2013.01); *G06K 9/6202* (2013.01); *G06T 7/593* (2017.01); *G06T 2207/30261* (2013.01)

(58) Field of Classification Search
USPC ............... 382/103, 104, 154, 209; 348/14.16
See application file for complete search history.

(56) References Cited

U.S. PATENT DOCUMENTS

| | | | | |
|---|---|---|---|---|
| 6,366,691 B1* | 4/2002 | Sogawa | ................ | G06T 7/0075 348/116 |
| 6,658,150 B2* | 12/2003 | Tsuji | .................... | G06K 9/6203 348/E13.014 |
| 2004/0061712 A1* | 4/2004 | Sogawa | ................. | G01C 11/06 345/698 |
| 2005/0008220 A1* | 1/2005 | Miyazaki | ............... | G01C 11/06 382/154 |
| 2005/0271264 A1* | 12/2005 | Ito | ........................... | G06T 5/006 382/154 |

(Continued)

FOREIGN PATENT DOCUMENTS

| | | |
|---|---|---|
| CN | 102855774 A | 1/2013 |
| JP | 3287465 B2 | 6/2002 |
| JP | 3349060 B2 | 11/2002 |

OTHER PUBLICATIONS

First Office Action Chinese Patent Application No. 201410494252.4 dated Sep. 30, 2016 with full English translation.

*Primary Examiner* — Bhavesh Mehta
*Assistant Examiner* — Narek Zohrabyan
(74) *Attorney, Agent, or Firm* — McDermott Will & Emery LLP

(57) ABSTRACT

When a positional relationship between reference blocks differs from a positional relationship between comparison blocks, a filtering device replaces the corresponding comparison blocks to update positional relationship information (order of correlations and the positional relationship thereof) into a state where the information should be and, thus, appropriately derives a difference value of an object so that the positional relationship between the reference blocks become identical to the positional relationship between the comparison blocks.

19 Claims, 16 Drawing Sheets

(56) References Cited

U.S. PATENT DOCUMENTS

2006/0029272 A1* 2/2006 Ogawa .................... G06K 9/32
 382/154
2009/0237491 A1* 9/2009 Saito ..................... G01C 11/06
 348/47
2012/0327236 A1 12/2012 Kiyohara et al.

* cited by examiner

FILTERING DEVICE

CROSS-REFERENCE TO RELATED APPLICATION

The present application claims priority from Japanese Patent Application No. 2013-205392 filed on Sep. 30, 2013, the entire contents of which are hereby incorporated by reference.

BACKGROUND

1. Technical Field

The present disclosure relates to a filtering device which appropriately derives a difference value (parallax) of an object in multiple comparison targets.

2. Related Art

There are conventionally known a technique, such as collision avoidance control, which detects specific objects including another vehicle located ahead of a vehicle, and avoids a collision with a leading vehicle, and a technique, such as a cruise control, which controls so as to maintain an inter-vehicle distance with a leading vehicle at a safe distance (for instance, see Japanese Patent (JP-B) No. 3,349,060).

Such a collision-avoidance control and cruise control derive parallaxes by using so-called pattern matching in order to acquire a relative distance from the vehicle, of an object located ahead of the vehicle. The pattern matching acquires image data from, for example, each of two imaging devices of which viewpoints differ from each other. The pattern matching then extracts any one of blocks (hereinafter, referred to as "the reference block") from an image (hereinafter, referred to as "the reference image") based on the image data generated by one of the imaging devices, and searches a highly-correlated block (hereinafter, referred to as "the comparison block") from an image (hereinafter, referred to as "the comparison image") based on the image data generated by the other imaging device. Then, the pattern matching refers to imaging parameters, such as installed positions and focal lengths of the imaging devices, uses so-called a stereo method or a triangulation method to calculate relative distance of the object with respect to the imaging devices based on the derived parallax, and converts the calculated relative distance into three-dimensional (3D) positional information which contains a horizontal distance and a height of the object in addition to the calculated relative distances. Further, various recognition processing are performed using the 3D positional information. Note that the term "horizontal" as used herein refers to screen transverse or lateral directions, and the term "vertical (described later)" as used herein refers to screen vertical directions which are perpendicular to the horizontal directions.

The pattern matching calculates a correlation of a block in the comparison image with each block in the reference image, while horizontally shifting the block in the comparison image, and uses a difference (difference values) in coordinates between the comparison image of the most-correlated block and the corresponding block in the reference images as the parallax. However, various objects exist ahead of the vehicle and the images may contain multiple similar objects and/or one object may contain similar subject parts. Typical examples of the similar objects and similar subject parts include a series of pylons, lighting posts or telegraph poles on road, and predetermined parts of a vehicle. If such similar objects and/or similar subject parts are located horizontally, one object and/or subject part may be matched with another similar object and/or subject part, leading to an erroneous derivation of the parallax.

For this reason, for example, JP-B No. 3,287,465 discloses a technique of the pattern matching that, determine when one comparison block of the comparison image has highest correlation with multiple reference blocks of the reference image (this event is simply referred to as "pairing"), determines only a parallax regarding one of the reference blocks having the minimum parallax to be valid.

However, since the technique disclosed in JP-B No. 3,287,465 excludes the parallax (difference value) regarding the reference block which was not determined to be valid, the comparison block corresponding to the reference block concerned is processed not to be existed although the comparison block actually exists. Further, if multiple comparison blocks corresponding to multiple reference blocks have matched with each other accidentally, that is, if one reference block is matched with a comparison block corresponding to another reference block and a comparison block corresponding to the one reference block associates with another reference block (this event is simply referred to as "the crossing pairing"), the technique disclosed in JP-B No. 3,287,465 cannot correct this erroneous matching.

SUMMARY OF THE INVENTION

The present disclosure has been designed in consideration of the circumstances described above, and an object thereof is to provide a filtering device that can appropriately derive a difference value of an object by evaluating relative positional relationships of reference blocks and relative positional relationships of comparison blocks.

According to one aspect of the present disclosure, a filtering device is provided, which includes an evaluation value deriving module that derives, per a pair of comparison targets having mutual relevance, multiple evaluation values indicative of correlations between any one of reference extracted parts extracted from one of the comparison targets and multiple comparison extracted parts extracted from the other comparison target, a positional relationship information deriving module that derives order of the correlations of the multiple evaluation values and a positional relationship of the order of correlations, and a positional relationship replacing module that identifies one of the comparison extracted parts corresponding to the reference extracted part from the multiple comparison extracted parts so that the positional relationship of the multiple comparison extracted parts and the positional relationship of the reference extracted parts before and after the extracted reference extracted part become identical to each other.

The positional relationship information deriving module may extract the multiple comparison extracted parts having relatively high correlations with the reference extracted part, derive the order of correlations of the comparison extracted parts to the reference extracted part and the positional relationship of the order of correlations, and associate the order of correlations and the positional relationship with the reference extracted part. The positional relationship replacing module may compare the order of correlations of the comparison extracted parts to one reference extracted part and the positional relationship of the order of correlations with the order of correlations of the comparison extracted parts to the other reference extracted part and the positional relationship of the order of correlations, respectively, and evaluate correlations of the comparison extracted parts corresponding to the reference extracted part.

When the comparison extracted part having the highest correlation to one reference extracted part is substantially identical in the positional relationship to the comparison extracted part having the highest correlation to the other reference extracted part, and when the comparison extracted part having the second highest correlation to the one reference extracted part is substantially identical in the positional relationship to the comparison extracted part having second highest correlation to the other reference extracted part, the positional relationship replacing module may evaluate that an error has occurred in the correlation of the comparison extracted part corresponding to either one of the reference extracted parts.

The positional relationship information deriving module may derive a relative position of the comparison extracted part with respect to the reference extracted part. When the relative position of the comparison extracted part having the second highest correlation to the one reference extracted part is substantially identical to the relative position of the comparison extracted part having the highest correlation to the other reference extracted part, the positional relationship replacing module may determine that an error has occurred in the correlation of the comparison extracted part corresponding to the one reference extracted part, and mutually replace the order of correlations of the comparison extracted parts corresponding to the one reference extracted part.

The positional relationship information deriving module may derive a relative position of the comparison extracted part with respect to the reference extracted part. When the relative position of the comparison extracted part having the highest correlation to the one reference extracted part is substantially identical to the relative position of the comparison extracted part having the second highest correlation to the other reference extracted part, the positional relationship replacing module may evaluate that an error has occurred in the correlation of the comparison extracted part corresponding to the other reference extracted part, and mutually replace the order of correlations of the comparison extracted parts corresponding to the other reference extracted part.

The positional relationship information deriving module may derive a relative position of the comparison extracted part with respect to the reference extracted part. When the relative position of the comparison extracted part having the second highest correlation to the one reference extracted part is not substantially identical to the relative position of the comparison extracted part having the highest correlation to the other reference extracted part, and the relative position of the comparison extracted part having the highest correlation to the one reference extracted part is not substantially identical to the relative position of the comparison extracted part having the second highest correlation to the other reference extracted part, the positional relationship replacing module may validate the comparison extracted part of which the relative position becomes the smallest with respect to the reference extracted part, and invalidate the relative positions of other comparison extracted parts.

When the comparison extracted part having the highest correlation to one reference extracted part is substantially identical in the positional relationship to the comparison extracted part having the second highest correlation to the other reference extracted part, and when the comparison extracted part having the second highest correlation to the one reference extracted part is substantially identical in the positional relationship to the comparison extracted part having the highest correlation to the other reference extracted part, the positional relationship replacing module may determine that an error may have occurred in the correlations of the comparison extracted parts corresponding to both the reference extracted parts.

The positional relationship information deriving module may derive a relative position of the comparison extracted part with respect to the reference extracted part. When the relative position of the comparison extracted part having the second highest correlation to the one reference extracted part is substantially identical to the relative position of the comparison extracted part having the second highest correlation to the other reference extracted part, the positional relationship replacing module may mutually replace the correlation of each comparison extracted part corresponding to both the reference extracted parts.

The positional relationship information deriving module may derive a relative position of the comparison extracted part with respect to the reference extracted part. When the relative position of the comparison extracted part having the highest correlation to the one reference extracted part is substantially identical to the relative position of the comparison extracted part having the highest correlation to the other reference extracted part, the positional relationship replacing module may determine that the correlation of each comparison extracted part corresponding to both the reference extracted parts is correct, respectively.

The positional relationship information deriving module may derive a relative position of the comparison extracted part with respect to the reference extracted part. When the relative position of the comparison extracted part having the second highest correlation to the one reference extracted part is not substantially identical to the relative position of the comparison extracted part having the second highest correlation to the other reference extracted part, and the relative position of the comparison extracted part having the highest correlation to the one reference extracted part is not substantially identical to the relative position of the comparison extracted part having the highest correlation to the other reference extracted part, the positional relationship replacing module may validate the relative position of one of the two reference extracted parts of which the relative position becomes the minimum, and invalidate the relative position of the other reference extracted part of which the relative position does not become the minimum.

The filtering device may be applied to a stereo imaging system that generates a pair of images having mutual relevance. The pair of comparison targets may be comprised of a reference image imaged by one of cameras of the stereo imaging system and a comparison image imaged by the other camera.

The filtering device may be applied to a monocular imaging device having a monocular camera, and the pair of comparison targets may be comprised of a pair of images imaged at different timings.

The filtering device may be applied to a monocular imaging device having a monocular camera, and the pair of comparison targets may be comprised of an image imaged by the camera and a template image prepared in advance.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
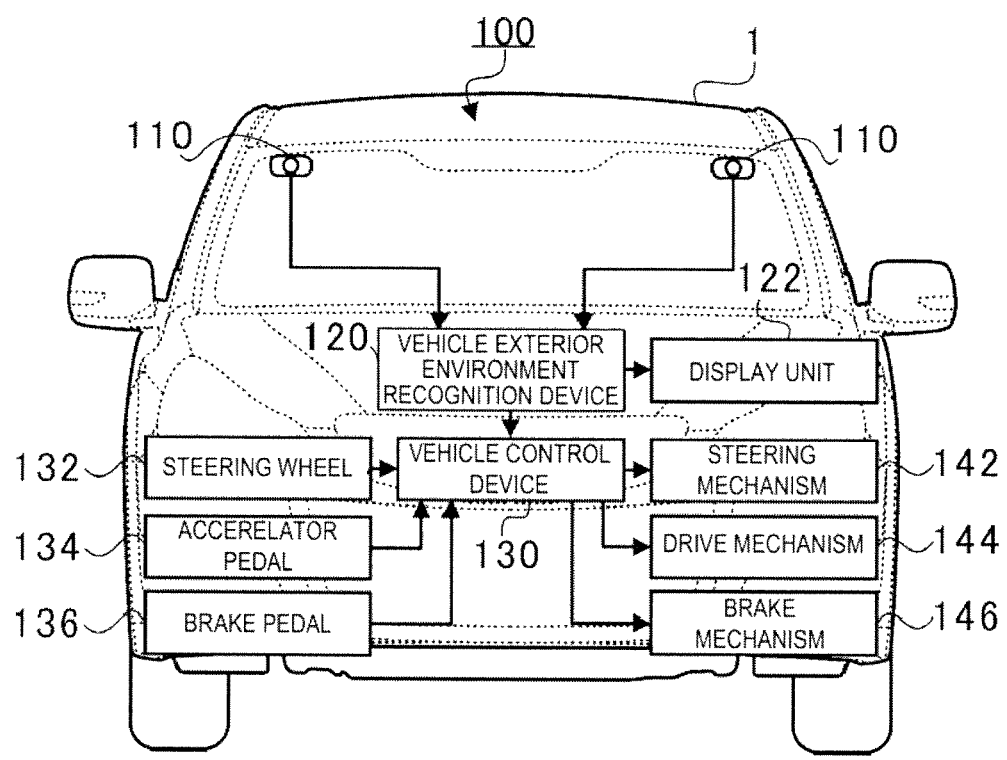
FIG. 1 is a block diagram illustrating a connecting relation of an environment recognition system.

Hereinafter, a suitable example of the present disclosure is described in detail with reference to the accompanying drawings. Dimensions, material, concrete numerical values, etc. illustrated in this example are merely instances for easier understanding of the present disclosure, and unless otherwise particularly specified, these instances are not intended to limit the present disclosure. Note that, in this description and the accompanying drawings, elements having substantially the same function and configuration are denoted with the same reference numerals in order to omit redundant explanation, and any other elements which are not directly related to the present disclosure are not illustrated in the accompanying drawings.

In recent years, vehicles having so-called a collision avoidance function (adaptive cruise control: ACC) have been spreading. This function images the road environment ahead of a vehicle where on-board cameras are mounted, identifies an object, such as a leading vehicle, based on color information and/or positional information obtained from the images (comparison target), and thereby avoiding a collision with the identified object and/or maintains an inter-vehicle distance with the leading vehicle at a safe distance.

The collision avoidance function uses, for example, a pair of imaging devices of which viewpoints differ from each other (a stereo imaging system) in order to acquire a relative distance from the vehicle, of object located ahead of the vehicle, compares an image acquired from the of imaging devices with another image acquired form the other imaging device to extract highly-correlated blocks (extracted parts) by using so-called pattern matching. These images are used herein as a pair of comparison targets, and one is called a "reference image" and the other is called a "comparison image." However, if multiple similar objects or similar subject parts in one object are located horizontally, one object or one subject part associates with another similar object or similar subject part, resulting in an erroneous derivation of a parallax (difference value). Thus, the purpose of this example is to appropriately derive the parallax of the object by evaluating a relative positional relationship between reference blocks (reference extracted parts) and a relative positional relationship between comparison blocks (comparison extracted parts), more specifically, positional relationships with higher correlations among evaluation values between the reference blocks and the comparison blocks. Note that the block indicates part comprised of one or more pixels in an image. Below, an environment recognition system for achieving such a purpose will be described, and a filtering device provided to a vehicle exterior environment recognition device which is a particular component of the environment recognition system will also be described in detail.

(Environment Recognition System 100)

FIG. 1 is a block diagram illustrating a connecting relation of the environment recognition system 100. The environment recognition system 100 is comprised of a pair of imaging devices 110 mounted inside a vehicle 1 (hereinafter, simply referred to as "the vehicle"), a vehicle exterior environment recognition device 120, and a vehicle control device 130 (which is typically comprised of an electronic control unit (ECU)).

Each imaging device 110 is comprised of imaging elements, such as charge-coupled devices (CCDs) or complementary metal-oxide semiconductors (CMOSs). Each imaging device 110 can image the environment ahead of the vehicle 1 to generate a color image consisting of three hues (R (red), G (green), and B (blue)) or a monochrome image. Note that the color image imaged by the imaging device 110 is adopted as a luminance image to distinguished it from a distance image described later.

Moreover, the two imaging devices 110 are disposed so as to be separated from each other in substantially lateral or horizontal directions such that they are oriented facing to the traveling direction of the vehicle 1 to have their optical axes being oriented substantially parallel to each other. Each imaging device 110 successively generates image data which is obtained by imaging objects existing within a detection area ahead of the vehicle 1 per frame, for example, at every 1/60 seconds (60 fps). Note that the term "object" to be recognized as used herein refers not only to a solid object existing independently, such as a vehicle, a pedestrian, a traffic light, a road surface (traveling path), a guardrail, and a building, but also to an object that can be identified as part of the solid object, such as a taillight, a blinker, each illuminating part of the traffic light. Each functional module described below carries out processing for every frame, triggered by a refreshing of such image data.

The vehicle exterior environment recognition device 120 acquires the image data from each of the two imaging devices 110, derives the parallax using so-called pattern matching, and associates the derived parallax information (corresponding to a relative distance described later) with the image data to generate the distance image. The pattern matching will be described later in detail. Further, the vehicle exterior environment recognition device 120 uses the luminances based on the luminance image and three-dimensional (3D) positional information in real space containing the relative distance with respect to the vehicle 1 based on the distance image to groups blocks, of which the luminances are equal and the 3D positional information are close to each other, as one unitary object, and then identifies specific object to which the object in the detection area ahead of the vehicle 1 corresponds.

When the specific object is identified, the vehicle exterior environment recognition device 120 derives a relative speed and the like of the specific object (for example, a leading vehicle) while tracking the specific object, and then determines whether a possibility of the specific object colliding with the vehicle 1 is high. Here, if the vehicle exterior environment recognition device 120 determines that the possibility of a collision is high, the vehicle exterior environment recognition device 120 then gives (informs) a vehicle operator a warning indication through a display unit 122 installed in front of the operator, and outputs information indicative of the warning to the vehicle control device 130.

The vehicle control device 130 accepts operational inputs of the operator through a steering wheel 132, an accelerator (gas pedal) 134, and a brake pedal 136, and transmits the inputs to a steering mechanism 142, a drive mechanism 144, and a brake mechanism 146, respectively, to control the vehicle 1. The vehicle control device 130 also controls the drive mechanism 144 and the brake mechanism 146 according to instructions from the vehicle exterior environment recognition device 120.

Next, the configuration of the vehicle exterior environment recognition device 120 is described in detail. Note that processing of the filtering device to calculate the parallax of the object which is feature of this example is described in detail and, thus, description of other configuration unrelated to the feature of this example is herein omitted.

(Vehicle Exterior Environment Recognition Device 120)

Figure 2:
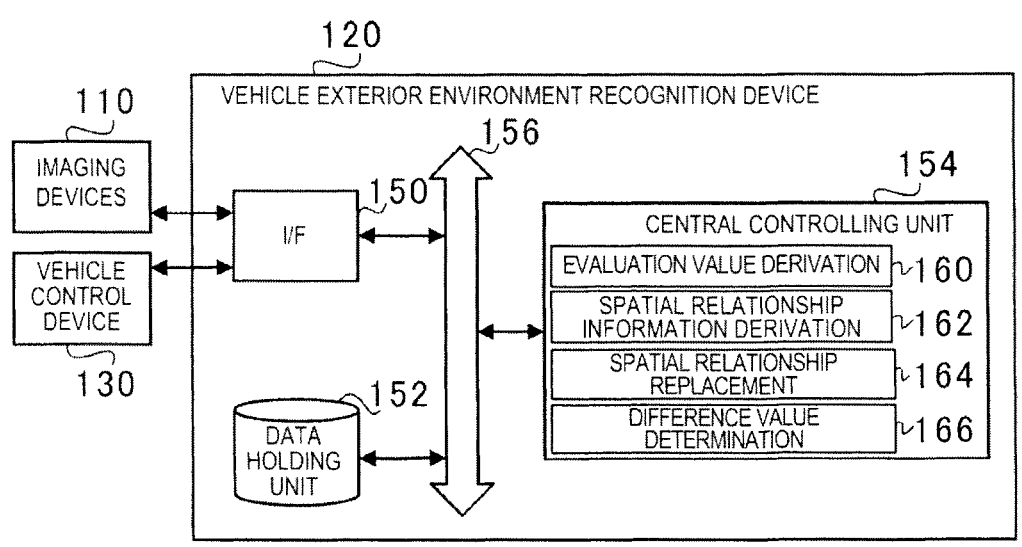
FIG. 2 is a functional block diagram schematically illustrating functions of a vehicle exterior environment recognition device.

FIG. 2 is a functional block diagram schematically illustrating functions of the vehicle exterior environment recognition device 120. As illustrated in FIG. 2, the vehicle exterior environment recognition device 120 is comprised of an I/F unit 150, a data holding unit 152, and a central controlling unit 154.

The I/F unit 150 is an interface that performs bidirectional information exchanges with the imaging devices 110 and the vehicle control device 130. The data holding unit 152 is comprised of one or more RAMs, one or more flash memories, one or more HDDs, etc. to hold various information required for the processing of each functional module described below, and temporarily hold the image data received from the imaging devices 110.

The central controlling unit 154 is comprised of one or more integrated circuits containing one or more central processing units (CPUs), one or more ROMs where one or more programs and the like are stored, or one or more RAMs as work areas, and controls the I/F unit 150, the data holding unit 152, etc. through a system bus 156. In this example, the central controlling unit 154 also functions as an evaluation value deriving module 160, a positional relationship information deriving module 162, a positional relationship replacing module 164, and a difference value determining module 166. In addition, the evaluation value deriving module 160, the positional relationship information deriving module 162, the positional relationship replacing module 164, and the difference value determining module 166 also function as the filtering device. Next, each functional module is described, while the reference image and the comparison image are illustrated.

Figure 3:
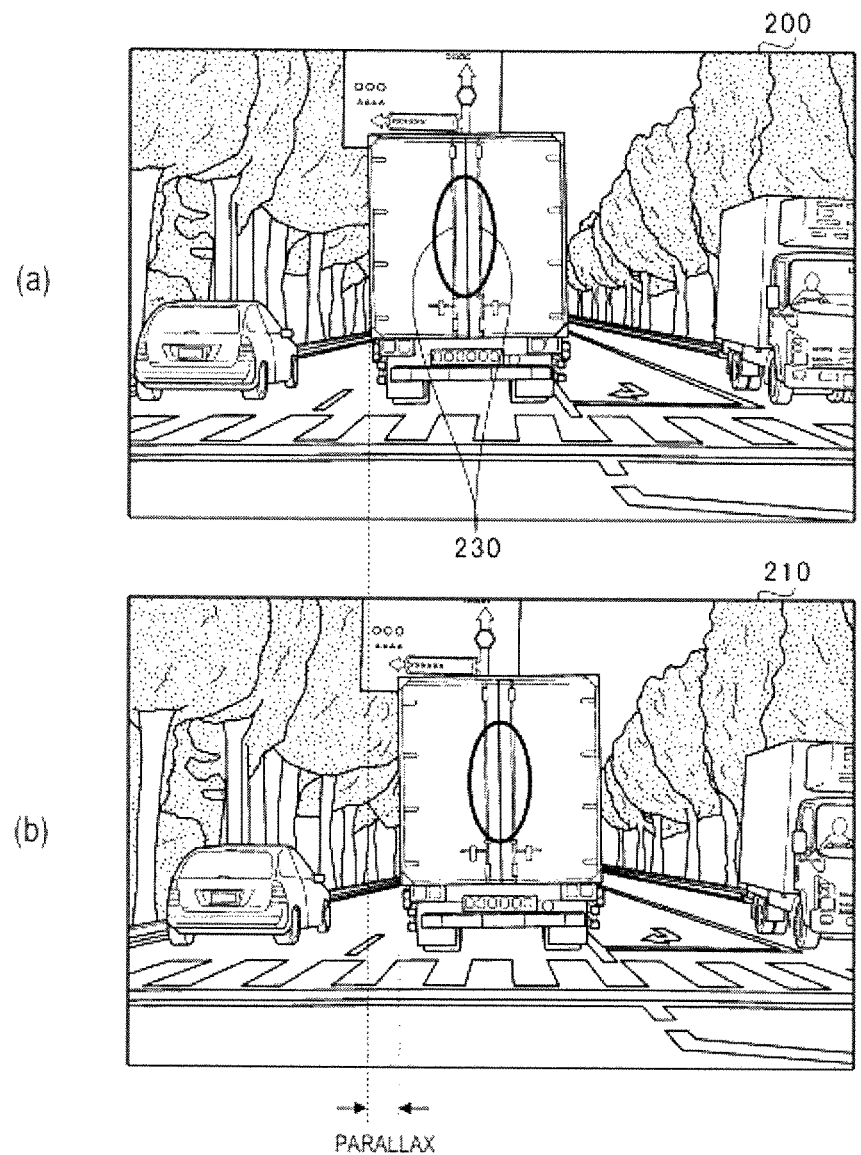
FIG. 3 is a diagram illustrating a reference image and a comparison image.

FIG. 3 is a diagram illustrating a reference image 200 and a comparison image 210. The upper part (a) of FIG. 3 illustrates the image from one of the imaging devices 110 located on the right, while the lower part (b) illustrates the corresponding image from the other imaging device 110 located on the left. In this example, the right image is used as the reference image 200, and the left image is used as the comparison image 210.

When the evaluation value deriving module 160 derives the evaluation value based on the reference image 200 and the comparison image 210, for example, in an area enclosed with an ellipse at the center of a truck in the upper part (a) and the lower part (b) of FIG. 3, two similar edges 230 extending vertically appears, and the reference blocks are mutually similar and the comparison blocks are mutually similar at the two edges 230. Thus, in this example, when the reference blocks are similar to each other, it should be avoided that a comparison block which should not be associated with one of the reference blocks is accidentally associated with the reference block. In other words, one reference block is avoided to be associated with a wrong or incorrect comparison block which is similar to a correct comparison block. This can be achieved as follows.

For example, if multiple reference blocks are similar to each other, the same number of comparison blocks corresponding to the reference blocks are similar to each other. That is, correlations of the plurality of comparison blocks tend to be high with respect to one reference block. For this reason, in this example, not only the comparison block having the highest correlation is extracted, but also the multiple comparison blocks with relatively high correlations which are considered to be similar to one reference block are also extracted. Then, a comparison block which should be associated with the reference block is identified from all the extracted comparison blocks.

Further, although the two imaging devices 110 differ just in the viewpoint, since they image the same photographic objects, the positional relationships based on the relative distances of the objects are substantially mutually identical in the reference block and the comparison block. That is, if the multiple reference blocks are similar to each other, the positional relationship of the multiple comparison blocks corresponding to the multiple reference blocks become substantially mutually identical to the positional relationship of the reference blocks. For this reason, in this example, the comparison blocks corresponding to at least one of the reference blocks are rearranged or replaced so that the positional relationship of the reference blocks and the positional relationship of the comparison blocks become identical.

Thus, the evaluation value deriving module 160 derives, per two images based on the two pieces of image data acquired from the two imaging devices 110, multiple evaluation values indicative of the correlations between any one of reference blocks extracted from one of the images (the reference image 200) and multiple comparison blocks extracted from the other image (the comparison image 210). Next, the positional relationship information deriving module 162 identifies a predetermined number of evaluation values having higher correlations from the multiple evaluation values derived by the evaluation value deriving module 160. The positional relationship information deriving module 162 then derives positional relationship information (correlations of the comparison blocks corresponding to the reference block) indicative of the order of correlations of the identified higher-correlated evaluation values and a positional relationship of the order of correlations, and associates the positional relationship information with the reference block. Here, an order of correlations and a temporary mutual positional relationship of the order of correlations are determined.

If the positional relationship information having a predetermined relation with the derived positional relationship information is not stored in the data holding unit 152, the positional relationship replacing module 164 associates the derived positional relationship information with the reference block, and stores it in the data holding unit 152. The predetermined relation will be described later in detail. Note that, if the reference block does not correspond to the comparison blocks appropriately, the newly derived positional relationship information may become the predetermined relation with the positional relationship information already stored in the data holding unit 152. Therefore, if the positional relationship information having the predetermined relation with the derived positional relationship information are stored in the data holding unit 152, the positional relationship replacing module 164 changes the positional relationship information on at least one of the reference blocks, and identifies the comparison block corresponding to the reference block (a position of the highest correlation) from the multiple comparison blocks so that the positional relationship of the multiple comparison blocks becomes identical to the positional relationship of the consecutive reference blocks based on the reference block corresponding to the derived positional relationship information, the reference block corresponding to the stored positional relationship information, and the positional relationship information. Thus, the positional relationship information (the order of correlations and the positional relationship thereof) is updated to a state where it should be. Then, the difference value determining module 166 determines the position of the highest correlation of the positional relationship information regarding the reference block identified by the positional relationship replacing module 164, as a parallax of the reference block. Next, the pattern matching processing will be described in detail.

(Pattern Matching Processing)

Figure 4:
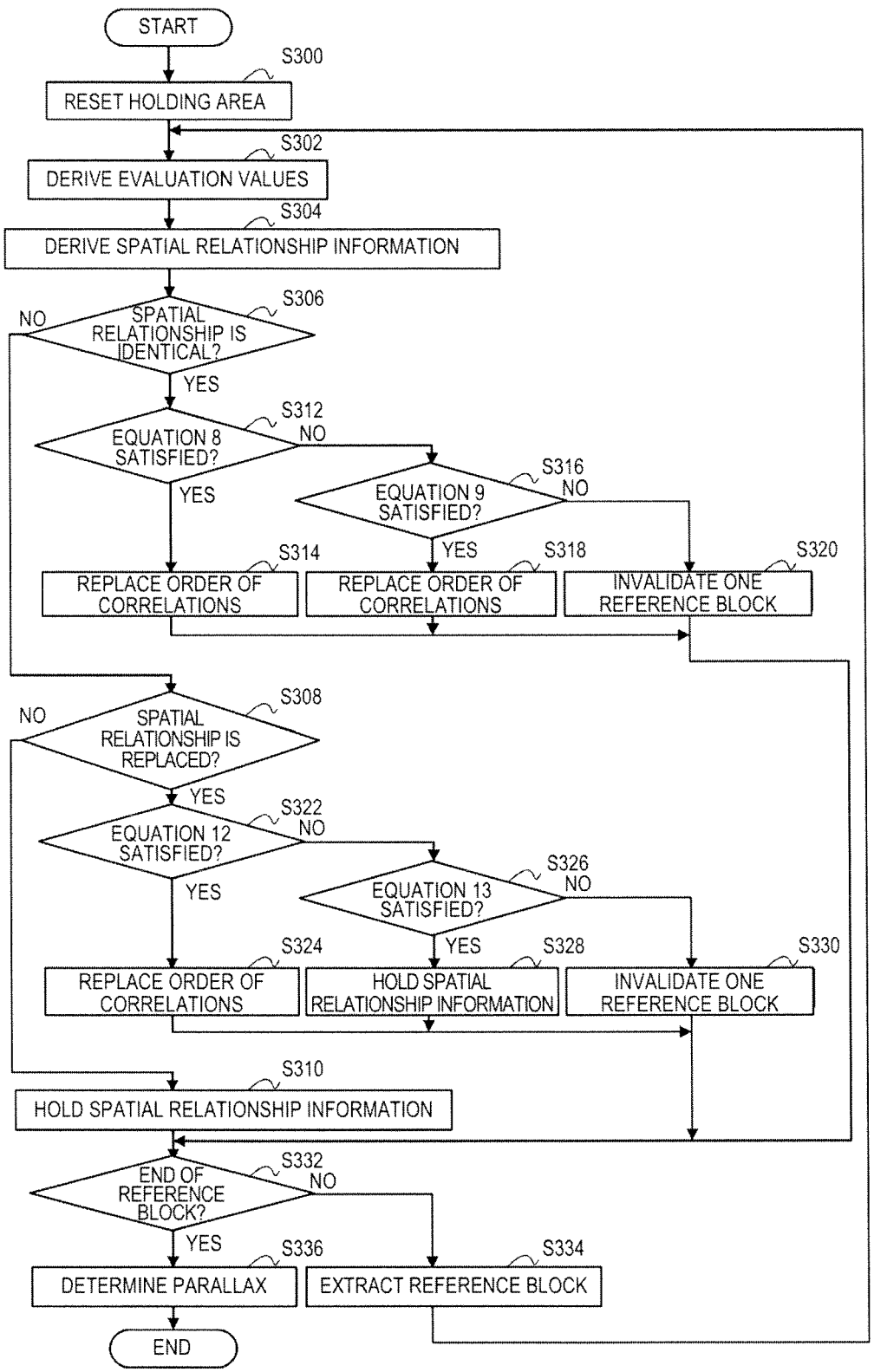
FIG. 4 is a flowchart illustrating operation of pattern matching processing.

FIG. 4 is a flowchart illustrating the operation of the pattern matching processing. Note that the pattern matching processing is performed as interrupt processing each time the image data is generated by the imaging devices 110. Moreover, an example where two evaluation values are identified from the highest will be described for convenience of explanation. Therefore, the order of correlations is comprised of two values, "first" and "second."

(Step S300)

The evaluation value deriving module 160 resets each holding area (a parallax candidate holding area, a reference holding area, a second holding area, a second parallax holding area, which will be described later) set in the data holding unit 152. Then, the evaluation value deriving module 160 acquires the image data from each of the two imaging devices 110, and extracts one reference block from the reference images 200 which serves as a reference, from the pair of images having mutual relevance based on the acquired two pieces of image data.

(Step S302)

The evaluation value deriving module 160 derives the multiple evaluation values indicative of the correlations of the extracted reference block with the multiple comparison blocks extracted from the comparison image 210 which is a comparison target, by so-called pattern matching.

The pattern matching may be a comparison in luminance (Y color-difference signal) per block between the pair of images. For example, the pattern matching includes approaches, such as a sum of absolute difference (SAD) in which a difference in luminance is calculated, a sum of squared intensity difference (SSD) which uses values obtained by squaring the differences, and a normalized cross correlation (NCC) which uses similarities of variances obtained by subtracting an average value of the luminance of pixels from the luminance of each pixel. Among these approaches, SAD will be particularly described herein as an instance. In this example, average value difference matching is also performed. This average value difference matching calculates an average value of luminance of pixels around a block in the reference image 200 and the comparison image 210 respectively, and subtracts each average value from the luminance of the pixels within the block to derive evaluation values. Next, the average value difference matching will in described.

Figure 5A:
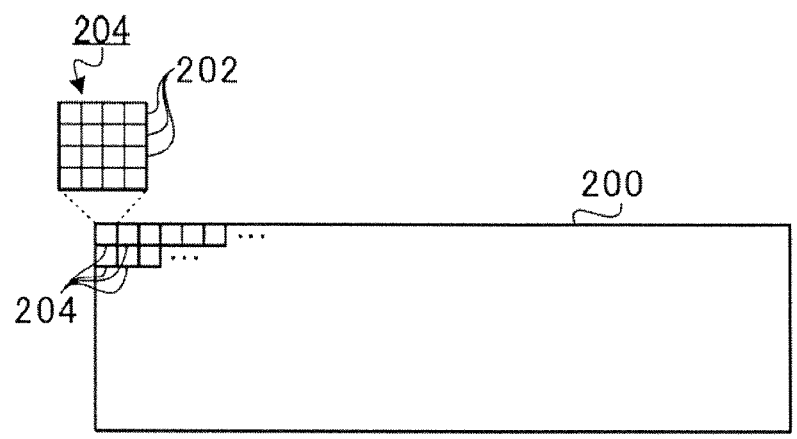
FIGS. 5A to 5C illustrate average value difference matching.
Figure 5B:
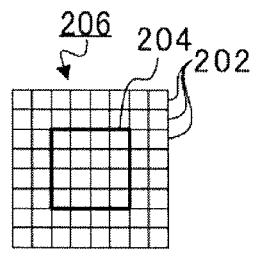
Figure 5C:
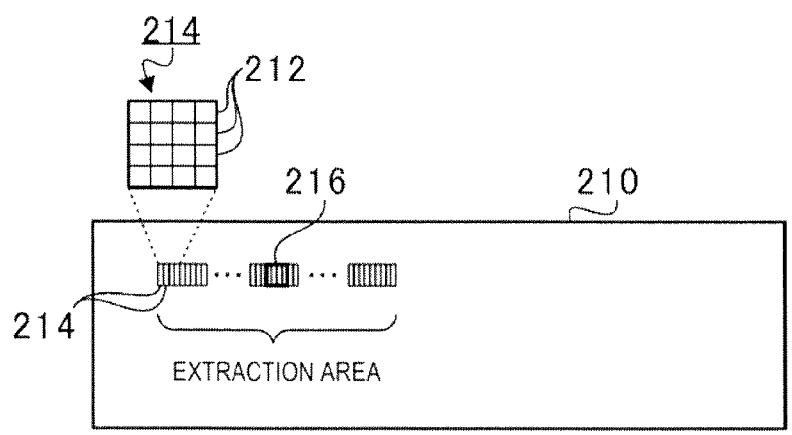

FIGS. 5A to 5C illustrate the average value difference matching. As illustrated in FIG. 5A, the evaluation value deriving module 160 first extracts a block 204 (hereinafter, referred to as "the reference block") comprised of a matrix of pixels 202, for example, consisting of 4 pixels in the horizontal directions×4 pixels in the vertical directions, from the reference image 200. The evaluation value deriving module 160 sequentially repeats the processing per block, by extracting another reference block 204 and deriving the parallax for each extracted reference block 204. While the reference block 204 is comprised of 4 pixels in the horizontal directions×4 pixels in the vertical directions in this example, any number of pixels within the reference block 204 may be selected.

One reference block 204 is extracted so as not to overlap with another adjacent reference block 204. In this example, the adjacent reference blocks 204 are extracted, and thus all 6,750 blocks (150 blocks in the horizontal directions×45 blocks in the vertical directions) are sequentially extracted as the reference block 204, for all the pixels 202 displayed within the detection area (for example, 600 pixels in the horizontal directions×180 pixels in the vertical directions).

Since the average value difference matching is adopted in this example as described above, the evaluation value deriving module 160 calculates, as illustrated in FIG. 5B, an average value Ab of luminance Rb(i, j) of the pixels 202 within an area 206 represented by 8 pixels in the horizontal directions×8 pixels in the vertical directions around the reference block 204 centering on the reference block 204 based on the following Equation 1:

$$Ab = \Sigma Rb(i,j)/64 \qquad \text{(Equation 1)}$$

Note that "i" is a horizontal pixel position in the area 206 (i=1 to 8), and "j" is a vertical pixel position in the area 206 (j=1 to 8). If the area 206 is partially located outside the reference image 200 (i.e., the area 206 is partially missing at an end of the reference image 200), the average value Ab is calculated while the missing part is omitted.

Then, the evaluation value deriving module 160 subtracts the above-described average value Ab from the luminances Eb(i, j) of each the pixels 202 within the reference block 204 to derive an average value difference luminances EEb(i, j), as the following Equation 2:

$$EEb(i,j) = Eb(i,j) - Ab \qquad \text{(Equation 2)}$$

Note that "i" is a horizontal pixel position in the reference block 204 (i=1 to 4), and "j" is a vertical pixel position in the reference block 204 (j=1 to 4).

The evaluation value deriving module 160 then extracts a block 214 (hereinafter, referred to as "the comparison block") represented by the matrix of pixels 212, for example, of 4 pixels in the horizontal directions×4 pixels in the vertical directions from the comparison image 210, as illustrated in FIG. 5C. Note that the evaluation value deriving module 160 sequentially extracts, for each one of the reference blocks 204, multiple comparison blocks 214, and derives the evaluation values indicative of correlations with the respective reference blocks 204.

The comparison block 214 is shifted by, for example, 1 pixel at a time in the horizontal direction and then extracted and, thus, the pixels of the adjacent comparison blocks 214 are overlapped. In this example, the total of 128 comparison blocks 214 to the left and right in the horizontal direction are extracted, for each one of the reference blocks 204, with respect to a position 216 corresponding to the reference block 204. Therefore, the extraction area (search area) has 131 pixels (=128+3 pixels) in the horizontal directions×4 pixels in the vertical directions. The positional relationship between the position 216 corresponding to the reference block 204 and the extraction area is set according to the appearing pattern of the parallaxes between the reference image 200 and the comparison image 210.

Since the average value difference matching is adopted in this example as described above, the evaluation value deriving module 160 calculates an average value Ac of luminance Rc(i, j) of pixels within an area represented by 8 pixels in the horizontal directions×8 pixels in the vertical directions around the comparison block 214 centering on the comparison block 214 based on the following Equation 3, similar to the reference block 204:

$$Ac = \tau Rc(i,j)/64 \quad \text{(Equation 3)}$$

Note that "i" is a horizontal pixel position within the area (i=1 to 8), and "j" is a vertical pixel position within the area (j=1 to 8).

Then, the evaluation value deriving module 160 subtracts the above described average value Ac from a luminance Ec(i, j) of each the pixels within the comparison block 214 to derive an average value difference luminances EEc(i, j), as the following Equation 4:

$$EEc(i,j) = Ec(i,j) - Ac \quad \text{(Equation 4)}$$

Note that "i" is a horizontal pixel position in the comparison block 214 (i=1 to 4), and "j" is a vertical pixel position in the comparison block 214 (j=1 to 4).

Next, the evaluation value deriving module 160 subtracts, from the average value difference luminances EEb(i, j) of each pixels 202 of the reference block 204, the average value difference luminances EEc(i, j) of each pixel 212 corresponding to the same position in the comparison block 214, and integrates the subtraction results to derive an evaluation value T, as illustrated in the following Equation 5:

$$T = \Sigma(EEb(i,j) - EEc(i,j)) \quad \text{(Equation 5)}$$

Thus, the multiple derived evaluation values T have higher correlations as the evaluation values T themselves have smaller values, i.e., smaller differences. Therefore, among the multiple evaluation values (here, 128 evaluation values) of one reference block 204 with the comparison blocks 214, the position of the minimum evaluation value (minimum value) serves as a candidate of the position indicating an end of the parallaxes.

Note that not only the minimum evaluation value but the second smallest evaluation value are selected as the candidates of the position indicative of the end of the parallax in this example. That is, two evaluation values, the minimum evaluation value and the second smallest evaluation value, become processing targets.

The above-described average value difference matching only uses high-frequency components of the image for the matching, and can remove low-frequency noise because it has an equivalent function to a high-pass filter. In addition, the matching has high accuracy of identifying the parallaxes and thus can improve accuracy of deriving the parallaxes, even under the effects of slight imbalances in luminance between the reference image 200 and the comparison image 210, and the effects of gain variation due to aging of the cameras (imaging devices) and/or analog circuit components.

(Step S304)

The positional relationship information deriving module 162 identifies the predetermined number of evaluation values (two values in this example) among the multiple evaluation values from the smallest value (i.e., from the values having highest correlations), and derives the positional relationship information indicative of the order of correlations in which the identified evaluation values are in ascending order (descending order in the correlation) and the positional relationships of the order of correlations.

Figure 6:
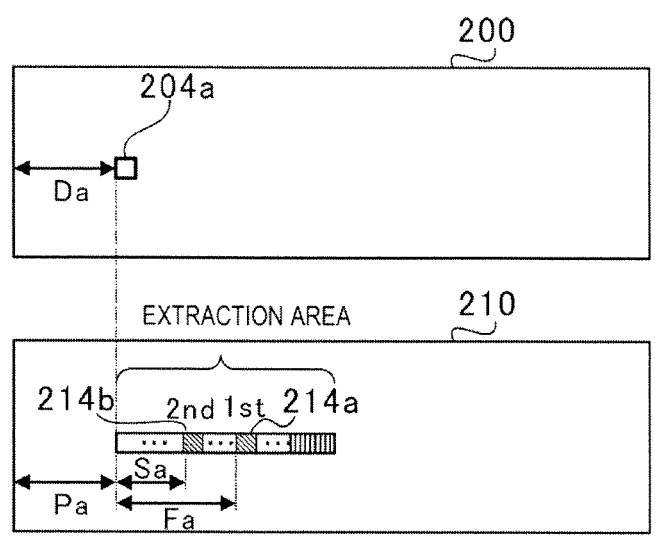
FIG. 6 is a diagram illustrating positional relationship information.
Figure 7A:
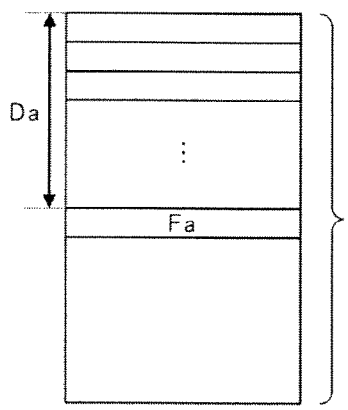
FIGS. 7A to 7D illustrate holding areas.
Figure 7B:
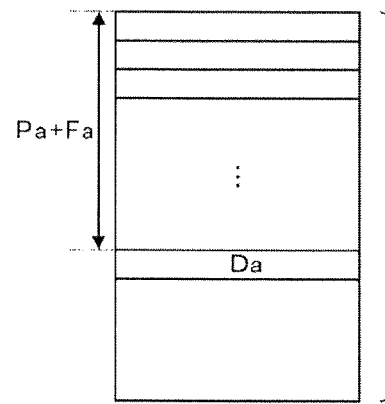
Figure 7C:
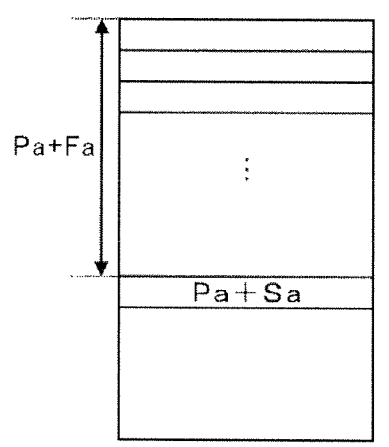
Figure 7D:
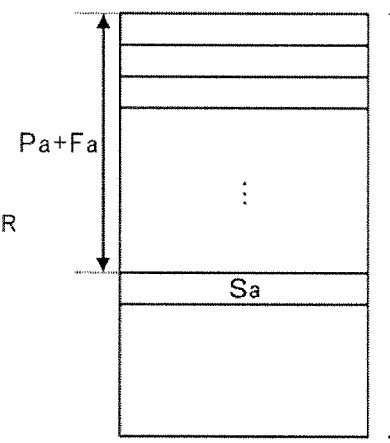

FIG. 6 is a diagram illustrating the positional relationship information. For example, as illustrated in FIG. 6, as a result of performing the average value difference matching with a reference block 204a, suppose that the evaluation value becomes the minimum at a comparison block 214a, and the evaluation value becomes the second smallest at a comparison block 214b. In such a case, the two comparison blocks 214a and 214b are associated with the order of correlations ("first" and "second"), respectively. Then, the positions of the two comparison blocks 214a and 214b in the comparison image 210 (positional relationship) are derived. For example, in the instance of FIG. 6, for a block position Da of the reference block 204a, the comparison block 214a of the first in the order of correlations is located at Pa+Fa, the comparison block 214b of the second in the order of correlations is located at Pa+Sa, and these serve as the positional relationship information. Thus, after the order of correlations and the positional relationships of the order of correlations are derived, the evaluation values themselves are not needed any longer. Note that Dx ("x" corresponds to an identifier of the reference block 204) is a block position in the reference image 200, and Px, Fx and Sx are pixel positions in the comparison image 210.

(Step S306)

Next, the positional relationship replacing module 164 determines the predetermined relation with the derived positional relationship information, in other words, whether the positional relationship information of which the positional relationships of the order of correlations have identical relation is stored in the data holding unit 152. Note that the phrase "positional relationships of the order of correlations have identical relation" as used herein refers to that the positions of the order of correlations of the comparison blocks 214 corresponding to the derived positional relationship information (for example, the first position Pa+Fa and the second position Pa+Sa) are identical to or substantially identical to the positions of the order of correlations of the comparison blocks 214 corresponding to the stored positional relationship information (for example, the first position Px+Fx and the second position Px+Sx), respectively. In such a case, it can be evaluated that an error has occurred in the correlation (positional relationship information) of one of the comparison block 214 corresponding to the reference blocks 204.

(Step S308)

If the positional relationship information of which the positional relationship has the identical relation to the order of correlations of the derived positional relationship information is not stored in the data holding unit 152, in a comparatively early phase of the pattern matching (NO at S306), the positional relationship replacing module 164 then determines the predetermined relation with the derived positional relationship information, more specifically, whether the positional relationship information where the positional relationships of the order of correlations have a mutually-replaced relation are stored in the data holding unit 152. Note that the phrase "positional relationships of the order of correlations have a mutually-replaced relation" as used herein refers to a relation in which the first and second positions are mutually replaced between the position of the order of correlations of the comparison block 214 corresponding to the derived positional relationship information (for example, the first position Pa+Fa, the second position Pa+Sa) and the position of the order of correlations of the comparison block 214 corresponding to the stored positional relationship information (for example, the first position Px+Fx, the second position Px+Sx). In such a case, it can be evaluated that an error may have occurred in the correlations (positional relationship information) of both the comparison blocks 214 corresponding to the reference block 204.

(Step S310)

If the positional relationship information of which the positional relationships of the order of correlations have the mutually-replaced relation with the derived positional relationship information is not stored in the data holding unit 152, in a comparatively early phase of the pattern matching (NO at S308), the positional relationship replacing module 164 associates the derived positional relationship information with the reference block 204a, stores it in each holding area of the data holding unit 152, and then transits the processing to Step S332.

FIGS. 7A to 7D illustrate holding areas. Specifically, FIG. 7A indicates a parallax candidate holding area, FIG. 7B indicates a reference holding area, FIG. 7C indicates a second holding area, and FIG. 7D indicates a second parallax holding area. For example, if the positional relationship information illustrated in FIG. 6 is to be held, a parallax of the reference block 204a, i.e., a difference (relative position) Fa between a pixel position Pa corresponding to the block position Da and the first position Pa+Fa is stored at the block position Da in the parallax candidate holding area in FIG. 7A. Further, the block position Da for identifying the reference block 204a which is used as original is stored at the first position Pa+Fa in the reference holding area in FIG. 7B. At the first position Pa+Fa of the second holding area in FIG. 7C, a second position Pa+Sa of the reference block 204a corresponding to of the first position is stored. At the first position Pa+Fa of the second parallax holding area in FIG. 7D, a difference (relative position) Sa when the second position Pa+Sa of the reference block 204a corresponding to the first position is selected as the parallax, is stored. Thus, the positional relationship information is stored in the data holding unit 152. As for the holding area, it can be determined whether any comparison block 214 has already been extracted as the first position with reference to the reference holding area, and if the comparison block 214 has been extracted as the first position, the information on second position can be acquired with reference to the second holding area or the second parallax holding area.

(Pairing)

Figure 8:
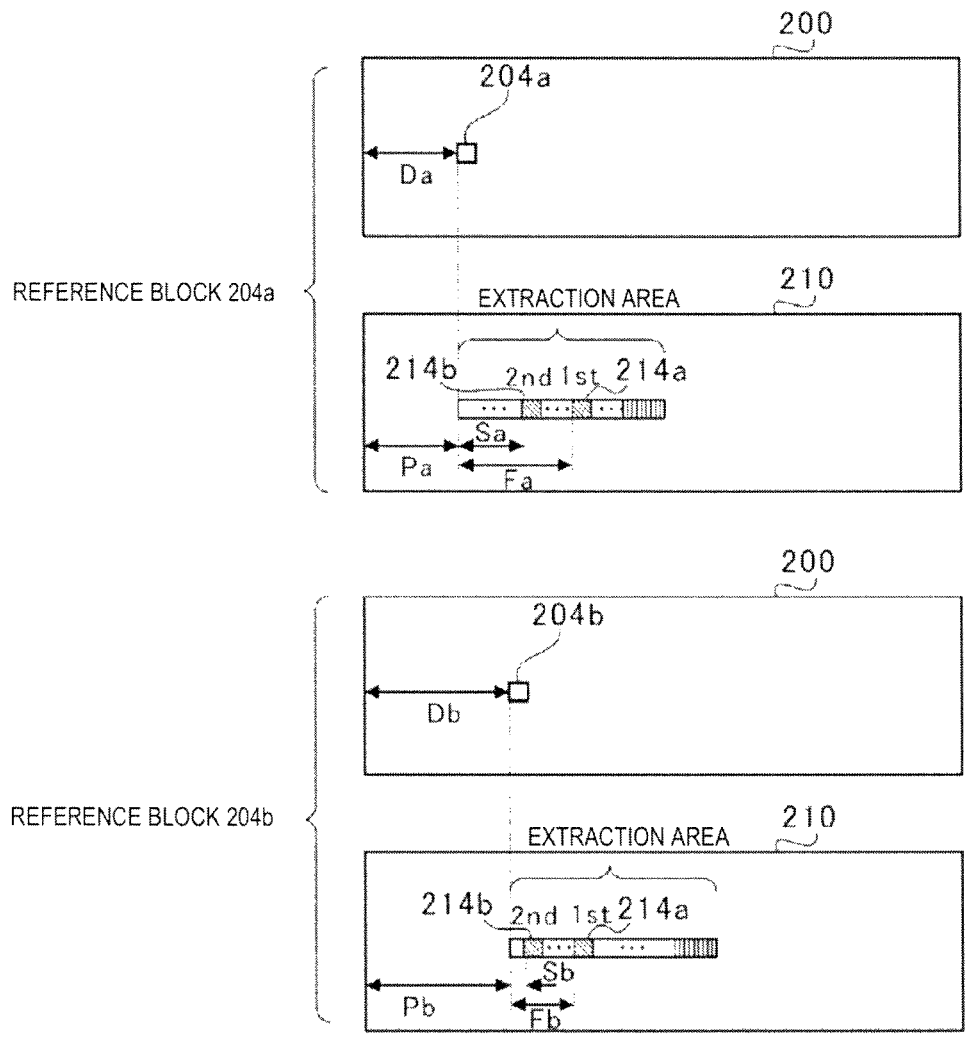
FIG. 8 is a diagram illustrating operation of a positional relationship replacing module.
Figure 9A:
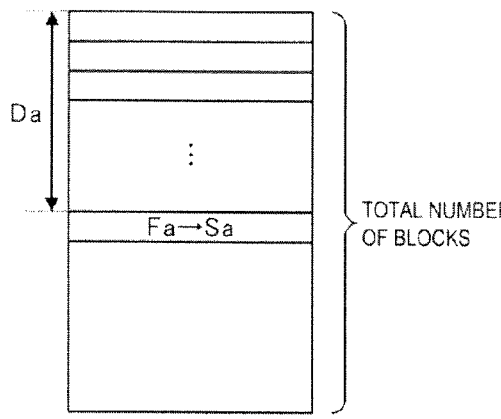
FIGS. 9A to 9D illustrate holding areas.
Figure 9B:
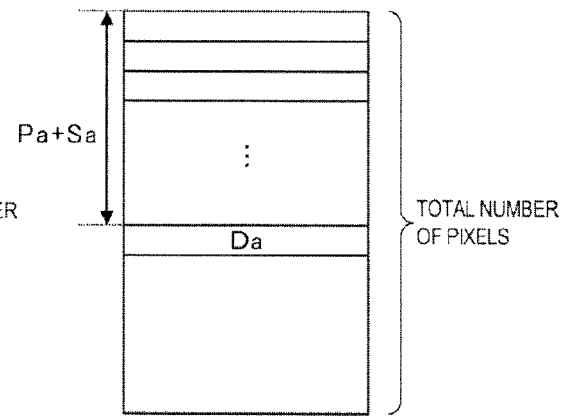
Figure 9C:
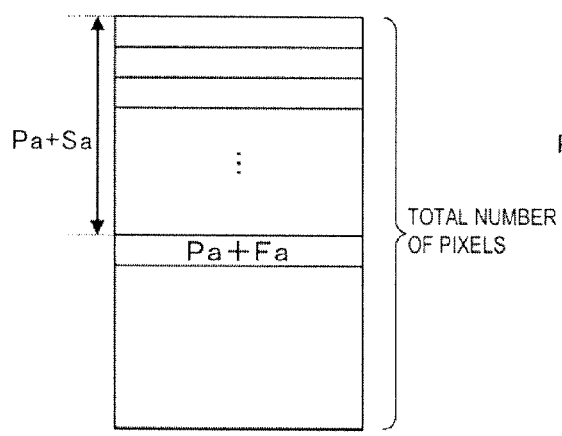
Figure 9D:
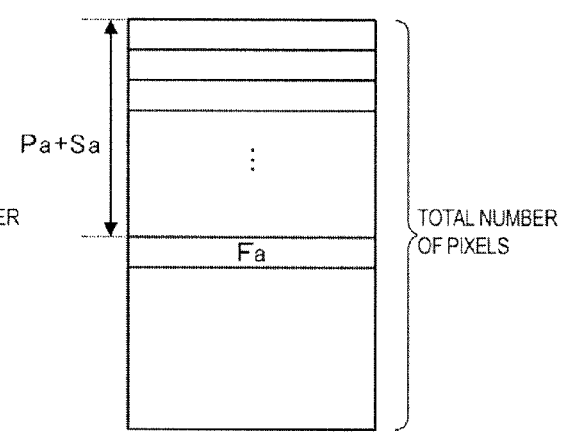

FIG. 8 is a diagram illustrating operation of the positional relationship replacing module 164. As described above, when the positional relationship information is stored in the data holding unit 152, the positional relationship information (Db, Pb, Fb, and Sb) on subsequent reference blocks (for example, 204b) may have a relation identical to the order of correlations of the stored positional relationship information (Da, Pa, Fa, and Sa). Thus, at Step S306, the positional relationship replacing module 164 determines whether the positional relationship information of which the order of correlations has an identical relation is stored in the data holding unit 152 based on the following Equations 6 and 7:

$$|(Pa+Fa)-(Pb+Fb)|<\text{Threshold} \quad \text{(Equation 6)}$$

$$|(Pa+Sa)-(Pb+Sb)|<\text{Threshold} \quad \text{(Equation 7)}$$

Equation 6 indicates that the first positions are mutually identical or substantially mutually identical if the difference of the first positions is less than the threshold, and Equation 7 indicates that the second positions are mutually identical or substantially mutually identical if the difference of the second positions is less than the threshold. If Equations 6 and 7 are satisfied, a possibility that the order of correlations for either one of the reference blocks 204 may be incorrect is high.

(Step S312)

If the positional relationship information of which the order of correlations has an identical relation to the derived positional relationship information is stored in the data holding unit 152, that is, if the conditions of Equations 6 and 7 are satisfied (YES at S306), the positional relationship replacing module 164 determines whether the following Equation 8 is satisfied:

$$|Fb-Sa|<\text{Threshold} \quad \text{(Equation 8)}$$

By using Equation 8, it can be determined whether a difference (relative position) Fb corresponding to the first parallax of the reference block 204b is identical or substantially identical to the difference (relative position) Sa corresponding to the second parallax of the reference block 204a.

(Step S314)

If Equation 8 is satisfied (YES at S312), since it can be concluded that the order of correlations is incorrect for one of the reference blocks (reference block 204a), the positional relationship replacing module 164 mutually replaces the orders of correlations for the reference blocks 204a, and stores the positional relationship information on the reference blocks 204a in the data holding unit 152, and then transits the processing to Step S332.

FIGS. 9A to 9D and FIGS. 10A to 10D illustrate holding areas. Specifically, the positional relationship replacing module 164 replaces the order of correlations (first and second) of the reference block 204a, as illustrated in FIGS. 9A to 9D, for the positional relationship information on the already stored reference block 204a. That is, the difference Sa between the pixel position Pa corresponding to the block position Da and the second position Pa+Sa is newly stored at the block position Da in the parallax candidate holding area in FIG. 9A. Further, the block position Da is stored at the second position Pa+Sa in the reference holding area in FIG. 9B. The first position Pa+Fa of the reference block 204a is stored at the second position Pa+Sa in the second holding area in FIG. 9C. The difference Fa corresponding to the parallax is stored at the second position Pa+Sa in the second parallax holding area in FIG. 9D. Thus, the positional relationship information on the reference block 204a is updated, and it is now ready for new pairing which may occur.

Figure 10A:
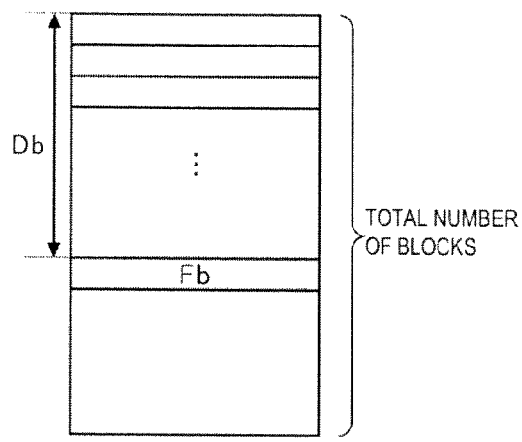
FIGS. 10A to 10D illustrate holding areas.
Figure 10B:
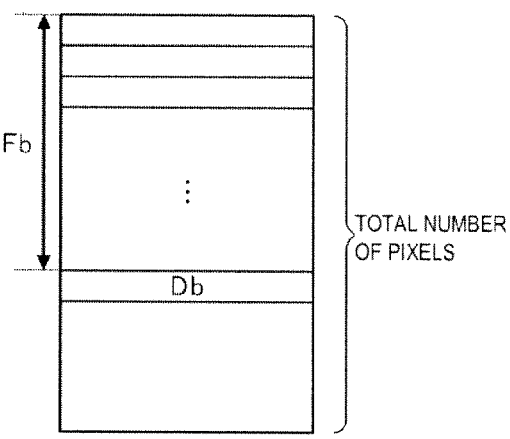
Figure 10C:
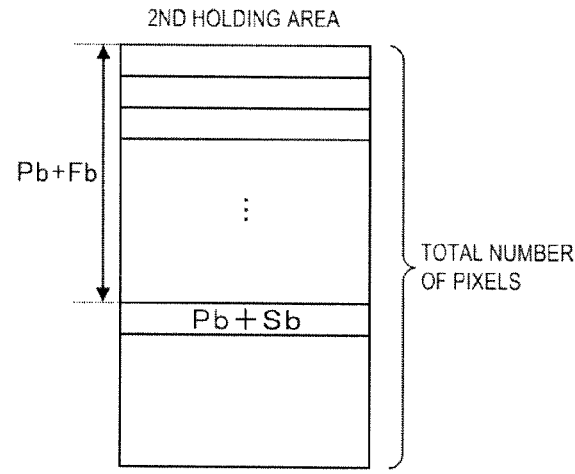
Figure 10D:
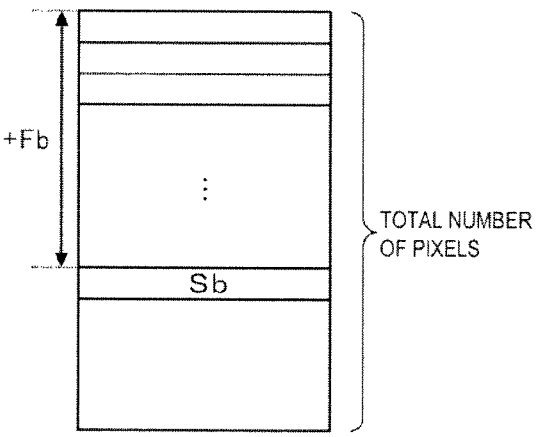
Figures 11A, 11B:
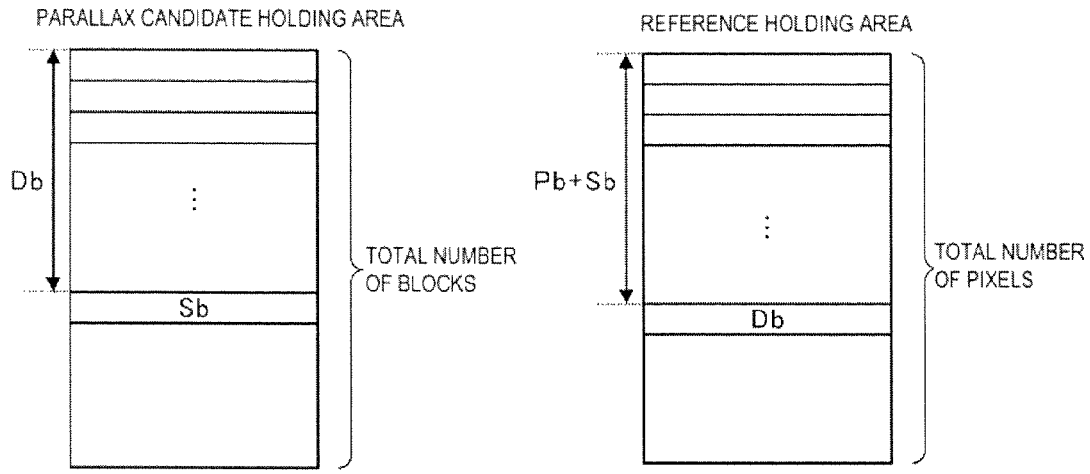
FIGS. 11A to 11D illustrate holding areas.
Figures 11C, 11D:
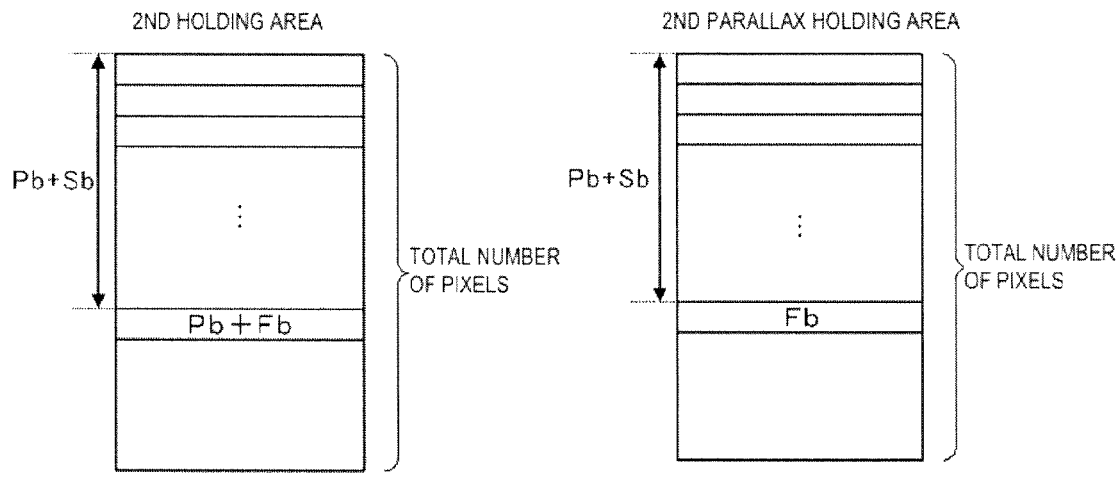

Further, the positional relationship replacing module 164 stores the difference Fb between a pixel position Pb corresponding to a block position Db and the first position Pb+Fb at the block position Db in the parallax candidate holding area in FIG. 10A, for the derived positional relationship information on the reference block 204b. Further, the block position Db for identifying the reference block 204b which becomes original is stored at the first position Pb+Fb in the reference holding area in FIG. 10B. A second position Pb+Sb is stored at the first position Pb+Fb in the second holding area in FIG. 10C. A difference Sb corresponding to the parallax is stored at the first position Pb+Fb in the second parallax holding area in FIG. 10D. Thus, the positional relationship information on the reference block 204b is stored in the data holding unit 152.
(Step S316)
If Equation 8 is not satisfied (NO at S312), the positional relationship replacing module 164 then determines whether the following Equation 9 is satisfied.

$$|Fa-Sb|<\text{Threshold} \qquad \text{(Equation 9)}$$

By using Equation 9, it can be determined whether the difference (relative position) Fa corresponding to the first parallax of the reference block 204a is identical or substantially identical to the difference (relative position) Sb corresponding to the second parallax of the reference block 204b.
(Step S318)
If Equation 9 is satisfied (YES at S316), since it can be concluded that the order of correlations is incorrect for the other reference block (reference block 204b), the positional relationship replacing module 164 mutually replaces the order of correlations (first and second) of the reference block 204b without updating the positional relationship information on the reference block 204a, stores the replaced positional relationship information in the data holding unit 152, and then transits the processing to Step S332.

FIGS. 11A to 11D illustrate holding areas. Specifically, the positional relationship replacing module 164 stores the difference Sb between a pixel position Pb corresponding to the block position Db and the second position Pb+Sb at the block position Db in the parallax candidate holding area in FIG. 11A, for the derived positional relationship information on the reference block 204b. Further, the block position Db is stored at the second position Pb+Sb in the reference holding area in FIG. 11B. A first position Pb+Fb of the reference block 204a is stored at the second position Pb+Sb in the second holding area in FIG. 11C. The difference Fb corresponding to the parallax is stored at the second position Pb+Sb in the second parallax holding area in FIG. 11D. Thus, the positional relationship information on the reference block 204b is stored in the data holding unit 152, and it is now ready for new pairing which may occur.
(Step S320)
If Equation 9 is not satisfied (NO at S316), only the parallax regarding one of the two reference blocks 204 (204a and 204b) of which the parallax becomes the minimum (the relative position with the comparison block 214 becomes the minimum) is accepted as a valid parallax, while rejecting the other reference block 204 of which the parallax does not become the minimum as an invalid parallax, and then transits the processing to Step S332.

Figures 12A, 12B:
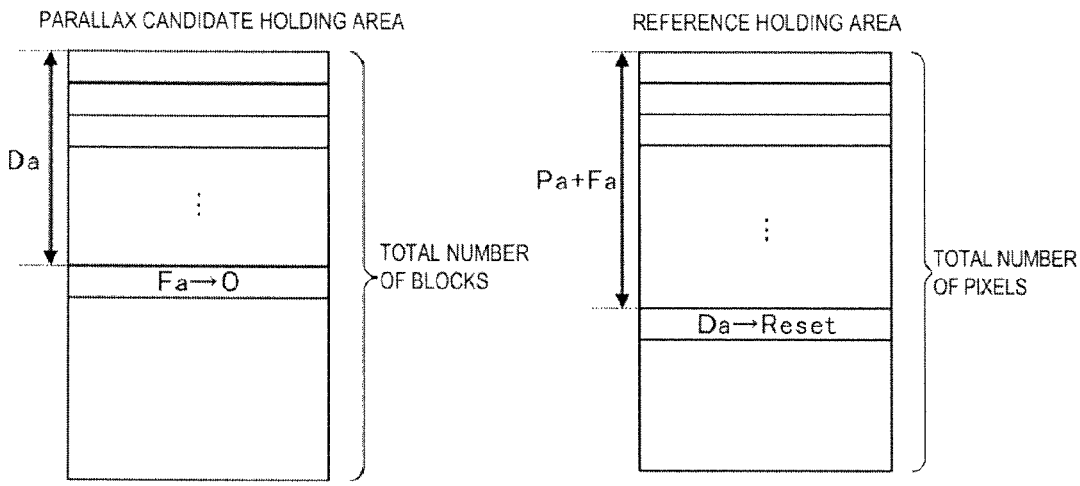
FIGS. 12A to 12D illustrate holding areas.
Figures 12C, 12D:
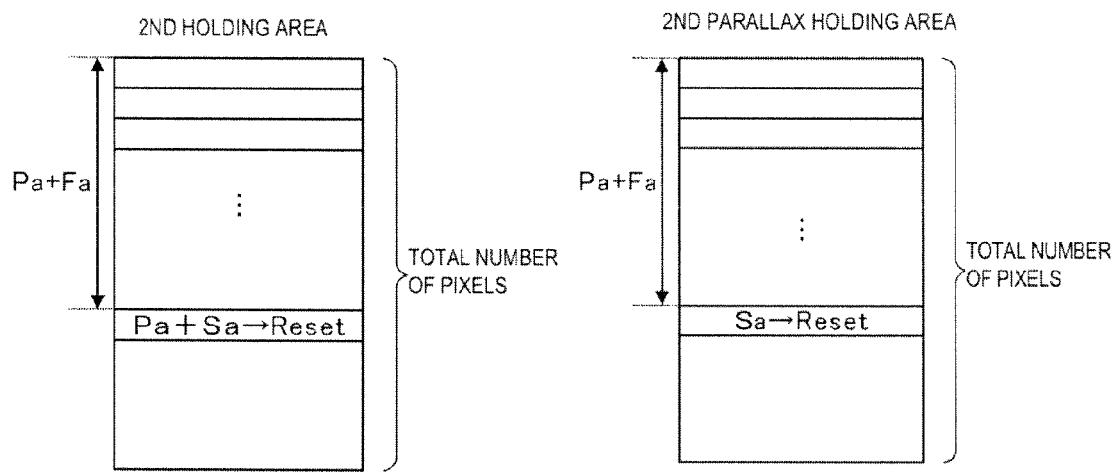

FIGS. 12A to 12D illustrate holding areas. When the reference block 204a is to be invalidated, the positional relationship replacing module 164 resets the positional relationship information on the already stored reference block 204a, as illustrated in FIGS. 12A to 12D. That is, the value Fa at the block position Da in the parallax candidate holding area in FIG. 12A is converted into zero. Further, all the values at the first position Pa+Fa in the respective holding areas in FIG. 12B to 12D are reset. Thus, the positional relationship information on the reference block 204a is invalidated. Since the existing techniques disclosed in, for example, Japanese Patent (JP) No. 3,287,465B2 is applicable to the invalidating processing of the reference block 204 of which the parallax does not become the minimum, the detailed explanation thereof is herein omitted.

Figure 13:
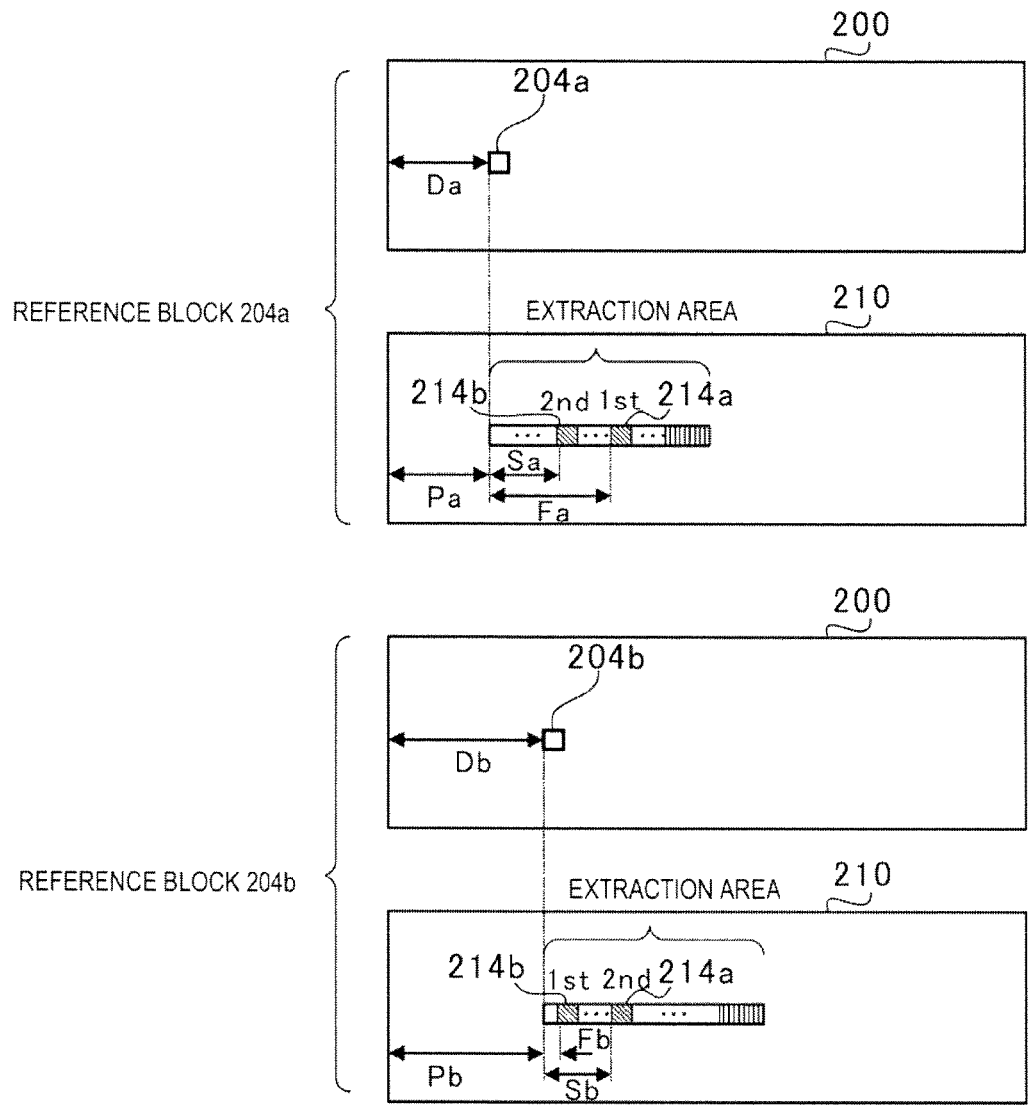
FIG. 13 is a diagram illustrating another operation of the positional relationship replacing module.
Figure 14A:
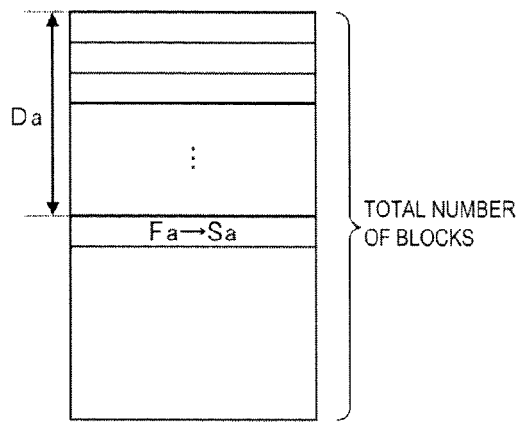
FIGS. 14A to 14D illustrate holding areas.
Figure 14B:
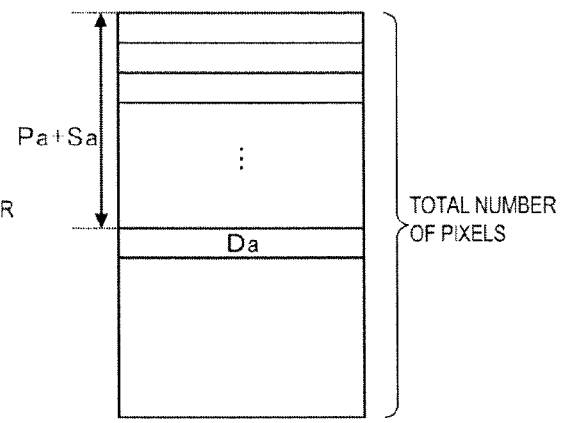
Figure 14C:
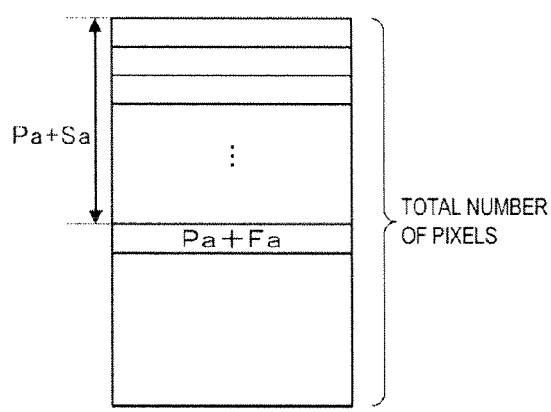
Figure 14D:
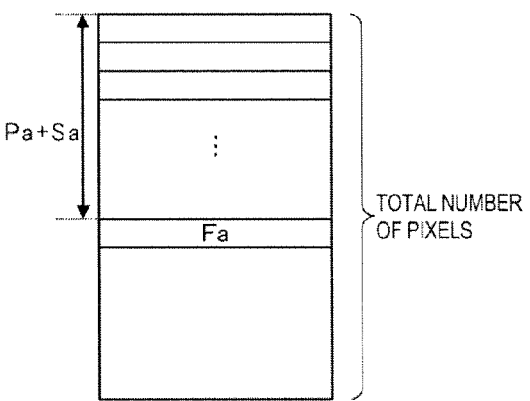

(Crossing Pairing)
FIG. 13 is a diagram illustrating other operation of the positional relationship replacing module 164. In the above, the case where the positional relationship information (Db, Pb, Fb, and Sb) on the reference block (for example, 204b) are identical in the order of correlations to the stored positional relationship information (Da, Pa, Fa, and Sa) is described. Next, a case where the orders of correlations of both the positional relationship information have the mutually-replaced relation will particularly be described. At Step S308, the positional relationship replacing module 164 determines whether the positional relationship information of which the order of correlations has the mutually-replaced relation is stored in the data holding unit 152 based on the following Equations 10 and 11:

$$|(Pa+Fa)-(Pb+Sb)|<\text{Threshold} \qquad \text{(Equation 10)}$$

$$|(Pa+Sa)-(Pb+Fb)|<\text{Threshold} \qquad \text{(Equation 11)}$$

If the difference between the first position of the reference block 204a and the second position of the reference block 204b is less than the threshold, Equation 10 indicates that the first position and the second position are identical or substantially identical to each other. If the difference between the second position of the reference block 204a and the first position of the reference block 204b is less than the threshold, Equation 11 indicates that the first position and the second position are identical or substantially identical to each other. If Equations 10 and 11 are satisfied, the orders of correlations for both the reference blocks 204 may be incorrect.
(Step S322)
If the positional relationship information of which the order of correlations has the mutually-replaced relation to the derived positional relationship information is stored in the data holding unit 152, that is, if the conditions of Equations 10 and 11 are satisfied (YES at S308), the positional relationship replacing module 164 then determines whether the following Equation 12 is satisfied:

$$|Sa-Sb|<\text{Threshold} \qquad \text{(Equation 12)}$$

By using Equation 12, it can be determined whether the second parallax (relative position) of the reference block 204a is identical or substantially identical to the second parallax (relative position) of the reference block 204b.
(Step S324)
If Equation 12 is satisfied (YES at S322), it can be concluded that the orders of correlations are incorrect for both the reference blocks 204a and 204b, and thus the positional relationship replacing module 164 mutually replaces the order of correlations for the reference block 204a and mutually replaces the order of correlations for the reference block 204b, stores the replaced positional relationship information in the data holding unit 152, and then transits the processing to Step S332.

FIGS. 14A to 14D and FIGS. 15A to 15D are diagrams illustrating holding areas. Specifically, regarding the already stored positional relationship information on the reference block 204a, the positional relationship replacing module 164 replaces the order of correlations for the reference block 204a, as illustrated in FIGS. 14A to 14D. That is, the difference Sa between the pixel position Pa corresponding to the block position Da and the second position Pa+Sa is newly stored at the block position Da in the parallax candidate holding area in FIG. 14A. The block position Da is stored at the second position Pa+Sa in the reference holding area in FIG. 14B. The first position Pa+Fa of the reference block 204*a* is stored at the second position Pa+Sa in the second holding area in FIG. 14C. A difference Fa corresponding to the parallax is stored at the second position Pa+Sa in the second parallax holding area in FIG. 14D. Thus, the positional relationship information on the reference block 204*a* is updated.

Figure 15A:
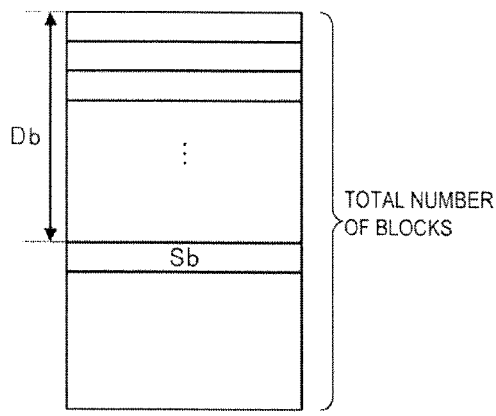
FIGS. 15A to 15D illustrate holding areas.
Figure 15B:
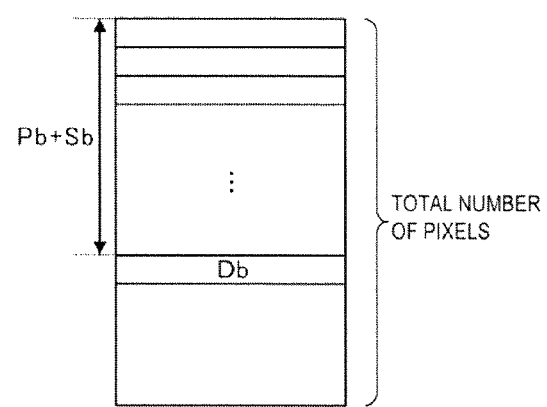
Figure 15C:
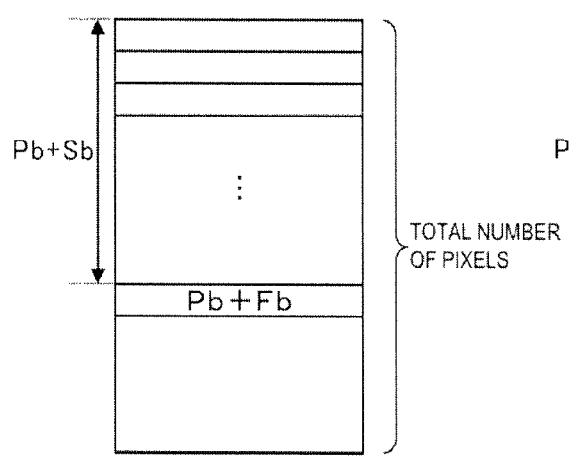
Figure 15D:
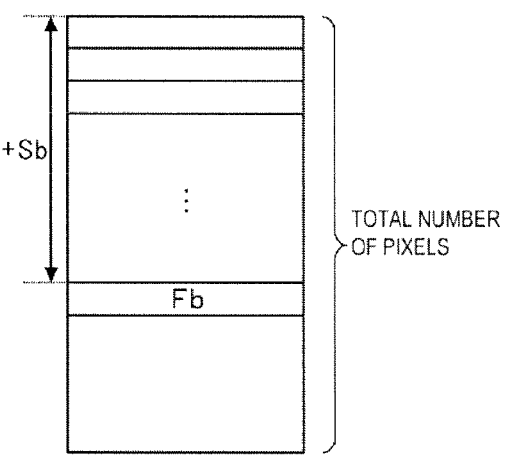
Figure 16A:
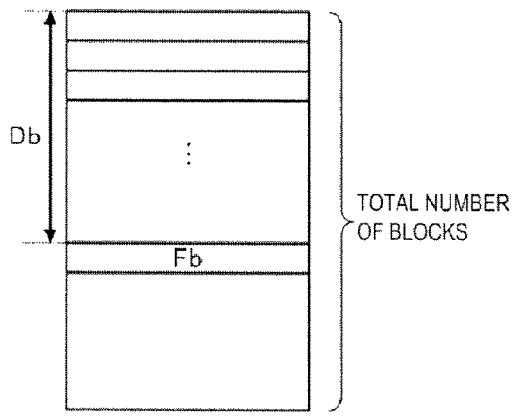
FIGS. 16A to 16D illustrate holding areas.
Figure 16B:
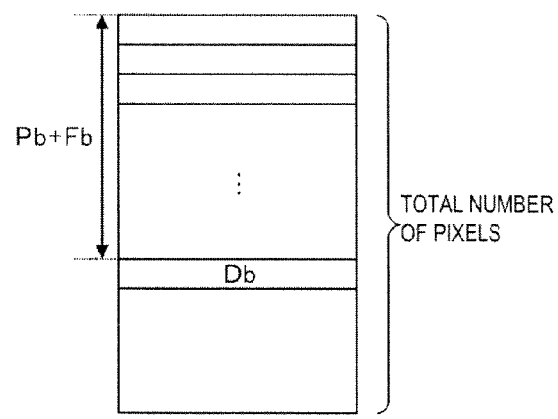
Figure 16C:
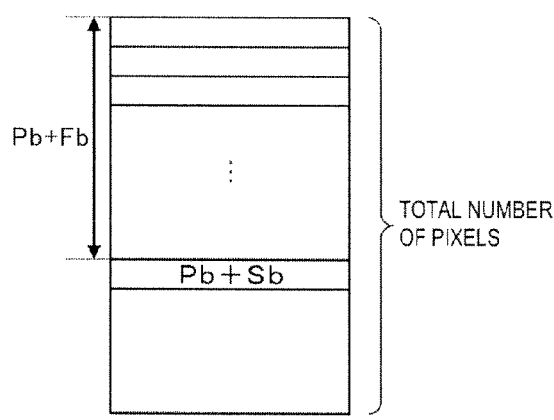
Figure 16D:
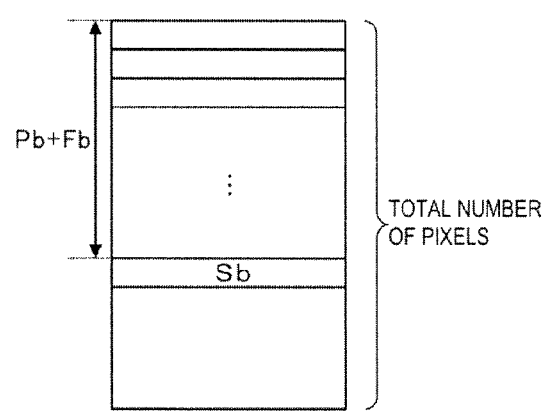

Further, the positional relationship replacing module 164 replaces the order of correlations of the derived positional relationship information on the reference block 204*b*, and stores the difference Sb between the pixel position Pb corresponding to the block position Db and the second position Pb+Sb at the block position Db in the parallax candidate holding area in FIG. 15A. Further, the block position Db for identifying the reference block 204*b* which becomes original is stored at the second position Pb+Sb in the reference holding area in FIG. 15B. The first position Pb+Fb is stored at the second position Pb+Sb in the second holding area in FIG. 15C. The difference Fb corresponding to the parallax is stored at the second position Pb+Sb in the second parallax holding area in FIG. 15D. Thus, the positional relationship information on the reference block 204*b* is updated correctly, and is stored in the data holding unit 152.

(Step S326)

If Equation 12 is not satisfied (NO at S322), the positional relationship replacing module 164 determines whether the following Equation 13 is satisfied:

$$|Fa-Fb|<\text{Threshold} \quad \text{(Equation 13)}$$

By using Equation 13, it can be determined whether the first parallax (relative position) of the reference block 204*a* is identical or substantially identical to the first parallax (relative position) of reference block 204*b*.

(Step S328)

If Equation 13 is satisfied (YES at S326), it can be concluded that the orders of correlations are correct for both the reference block 204*a* and the reference block 204*b*, and thus the positional relationship replacing module 164 stores the positional relationship information on the reference block 204*b* in the data holding unit 152 without updating the positional relationship information on the reference block 204*a*, and then transits the processing to Step S332.

FIGS. 16A to 16D are diagram illustrating holding areas. Specifically, for the derived positional relationship information on the reference block 204*b*, the positional relationship replacing module 164 stores the difference Fb between the pixel position Pb corresponding to the block position Db and first position Pb+Fb is stored at the block position Db in the parallax candidate holding area in FIG. 16A. Further, the block position Db is stored at the first position Pb+Fb in the reference holding area in FIG. 16B. The second position Pb+Sb of the reference block 204*a* is stored at the first position Pb+Fb in the second holding area in FIG. 16C. The difference Sb corresponding to the parallax is stored at the first position Pb+Fb in the second parallax holding area in FIG. 16D. Thus, the positional relationship information on the reference block 204*b* is stored in the data holding unit 152.

(Step S330)

If Equation 13 is not satisfied (NO at S326), the positional relationship replacing module 164 validates only the parallax of one of the reference blocks 204 (204*a* and 204*b*) of which the parallax become the minimum (the relative position with the comparison block 214 becomes the minimum), while invalidating the parallax of the other reference block 204 of which the parallax does not become the minimum, and then transits the processing to Step S332. Since this processing has already been described using FIGS. 12A to 12D, the detailed explanation is herein omitted.

(Step S332)

Next, the positional relationship replacing module 164 determines whether processing of Steps S302 to S330 has been completed for all the target reference blocks 204.

(Step S334)

If the processing has not been completed for all the target reference blocks 204 (NO at S332), the positional relationship replacing module 164 newly extracts one reference block 204 from the reference image to be a reference, and then repeats the processing from Step S302.

(Step S336)

If the processing has been completed for all the target reference blocks 204 (YES at S332), the difference value determining module 166 determines, as the parallax of the reference block 204, the position of the highest order of correlation (i.e., the first position) in the positional relationship information regarding the reference block 204, which is identified by the positional relationship replacing module 164, and then ends the pattern matching processing.

As described above, even if one comparison block 214 of the comparison image 210 becomes highest in the correlation with the multiple reference blocks 204 of the reference image 200 in pattern matching, the parallax of the object can be derived appropriately by evaluating the relative positional relationship between the reference blocks and the relative positional relationship between the comparison blocks, and replacing and correcting the order(s) of correlations of the positional relationship information which is not in the correct order of correlations, without simply invalidating one of the reference blocks 204. Thus, the positional relationship between the reference blocks 204 and the positional relationship between the comparison blocks 214 are associated with each other more clearly.

The present disclosure may be provided in the form of one or more computer programs which cause one or more computers to function as the filtering device or the environment recognition system 100 described above, or one or more storage media which record the program(s) and can be read by the computer(s), such as flexible discs, magneto-optic discs, ROMs, CDs, DVDs, or BDs. Note that the term "program" as used herein refers to a data set described by any language and/or any describing method.

As described above, although the suitable example of the present disclosure is described referring to the accompanying drawings, the present disclosure is not intended to be limited to the example. It is apparent that a person skilled in the art can reach various kinds of changes or modifications without departing from the scope of the appended claims, and it should be understood that those derivatives encompass the technical scope of the present disclosure.

For example, in the above example, although the pair of images which are simultaneously imaged by the two imaging devices 110 having different viewpoints are used as the comparison targets, wide variety of image pair having mutual relevance may also be applicable to the concept of the present disclosure, without any limitations. Such a pair of images having mutual relevance include, for example, two images imaged at different timings by a single imaging device (monocular imaging device) and outputted in a time series manner, which are processing targets of so-called optical flow, or a combination of an image which is imaged by an imaging device and another image (template image) which is prepared in advance, which are processing targets of so-called template matching. Further, although the "parallax" between the pair of images which are simultaneously imaged by the two imaging devices 110 having different viewpoints are used as the difference value in the above example, the difference value may be, but not limited to, any difference between corresponding extracted parts, such as a difference between reference blocks in the pair of images having mutual relevance.

Further, although the luminance images are used as the comparison targets and the evaluation values are derived based on the luminances of the luminance images in the above example, information other than the luminances, for example, heat distributions acquired from one or more far-infrared cameras, or distributions of reflection intensities acquired from a laser radar, a millimeter wave radar, etc. may also be used the comparison targets, and the evaluation values may be derived based on the distributions. Also in such a case, the difference values may similarly be the difference between the corresponding extracted parts as described above.

Further, as illustrated in FIG. 3, although the area located at the center of the track is described in the above example, the area may also be applicable to a train of pylons, lightings, or telegraph poles on a road, or a predetermined part of a vehicle, such as a taillight.

Further, although the processing in which two difference values, "first" and "second," are used as the candidates in the above example, more than two difference values may be used as the candidates of similar pairing and crossing pairing by adding a corresponding holding area in the data holding unit 152.

Note that the processes of the pattern matching may not be processed in the time series or in the order indicated in the flowchart, and the pairing and the crossing pairing may instead be carried out in parallel processing or subroutines, for example. If the pairing and the crossing pairing are carried out in parallel, both the phenomenon may be established at the same time. In such a case, either one of the processing may be carried out first, and the other processing may then be carried out to determine whether either one of the processing is correct by using the processing results.

The present disclosure can be used for the filtering device which appropriately derives the difference value (parallax) of the object in the multiple images.

The invention claimed is:

1. A filtering device, comprising:
   an evaluation value deriving module that derives, per a pair of comparison targets having mutual relevance, multiple evaluation values indicative of correlations between any one of reference extracted parts extracted from one of the comparison targets and multiple comparison extracted parts extracted from the other comparison target;
   a positional relationship information deriving module that, for each of the reference extracted parts, derives an order of the respective correlations of the multiple comparison extracted parts and respective positional relationships of at least some of the multiple comparison extracted parts in the ordered correlations to the reference extracted part, wherein, for each of the reference extracted parts, a first candidate for determining a correct correlation for the reference extracted part is identified based on a comparison extracted part with a highest correlation to the reference extracted part in the ordered correlations for that reference extracted part; and
   a positional relationship replacing module that, for at least one reference extracted part, replaces the identified first candidate with a different first candidate, based on one of the comparison extracted parts that does not have the highest correlation to that reference extracted part, so that the difference between the positional relationship of that one reference extracted part to the different first candidate and the positional relationship of another reference extracted part to the identified first candidate is less than a predetermined amount.

2. The filtering device of claim 1, wherein
the positional relationship information deriving module extracts a predetermined number of the multiple comparison extracted parts having the highest correlations with the reference extracted part, derives the order of correlations of the comparison extracted parts to the reference extracted part and the positional relationship of the order of correlations, and associates the order of correlations and the positional relationship with the reference extracted part; and
the positional relationship replacing module compares the order of correlations of the comparison extracted parts to one reference extracted part and the positional relationship of the order of correlations with the order of correlations of the comparison extracted parts to the other reference extracted part and the positional relationship of the order of correlations, respectively, and evaluates correlations of the comparison extracted parts corresponding to the reference extracted part.

3. The filtering device of claim 2, wherein,
when the difference between the position of the comparison extracted part having the highest correlation to one reference extracted part and the position of the comparison extracted part having the highest correlation to the other reference extracted part is less than a predetermined amount, and the difference between the position of the comparison extracted part having the second highest correlation to the one reference extracted part and the position of the comparison extracted part having second highest correlation to the other reference extracted part is less than the predetermined amount, the positional relationship replacing module evaluates that an error has occurred in the correlation of the comparison extracted part corresponding to either one of the reference extracted parts.

4. The filtering device of claim 3, wherein
the positional relationship information deriving module derives a relative position of the comparison extracted part with respect to the reference extracted part; and
when the difference between the relative position of the comparison extracted part having the second highest correlation to the one reference extracted part and the relative position of the comparison extracted part having the highest correlation to the other reference extracted part is less than a predetermined amount, the positional relationship replacing module determines that an error has occurred in the correlation of the comparison extracted part corresponding to the one reference extracted part, and mutually replaces the order of correlations of the comparison extracted parts corresponding to the one reference extracted part.

5. The filtering device of claim 3, wherein
the positional relationship information deriving module derives a relative position of the comparison extracted part with respect to the reference extracted part; and
when the difference between the relative position of the comparison extracted part having the highest correlation to the one reference extracted part and the relative position of the comparison extracted part having the second highest correlation to the other reference extracted part is less than a predetermined amount, the positional relationship replacing module determines that an error has occurred in the correlation of the comparison extracted part corresponding to the other reference extracted part, and mutually replaces the order of correlations of the comparison extracted parts corresponding to the other reference extracted part.

6. The filtering device of claim 4, wherein
the positional relationship information deriving module derives a relative position of the comparison extracted part with respect to the reference extracted part; and
when the difference between the relative position of the comparison extracted part having the highest correlation to the one reference extracted part and the relative position of the comparison extracted part having the second highest correlation to the other reference extracted part is less than a predetermined amount, the positional relationship replacing module determines that an error has occurred in the correlation of the comparison extracted part corresponding to the other reference extracted part, and mutually replaces the order of correlations of the comparison extracted parts corresponding to the other reference extracted part.

7. The filtering device of claim 3, wherein
the positional relationship information deriving module derives a relative position of the comparison extracted part with respect to the reference extracted part; and
when the difference between the relative position of the comparison extracted part having the second highest correlation to the one reference extracted part and the relative position of the comparison extracted part having the highest correlation to the other reference extracted part is not less than a predetermined amount, and the difference between the relative position of the comparison extracted part having the highest correlation to the one reference extracted part and the relative position of the comparison extracted part having the second highest correlation to the other reference extracted part is not less than a predetermined amount, the positional relationship replacing module validates the comparison extracted part of which the relative position becomes the smallest with respect to the reference extracted part, and invalidates the relative positions of other comparison extracted parts.

8. The filtering device of claim 2, wherein, when the difference between the relative position of the comparison extracted part having the highest correlation to one reference extracted part and the relative position of the comparison extracted part having the second highest correlation to the other reference extracted part is less than a predetermined amount, and the difference between the relative position of the comparison extracted part having the second highest correlation to the one reference extracted part and the relative position of the comparison extracted part having the highest correlation to the other reference extracted part is less than a predetermined amount, the positional relationship replacing module determines that an error may have occurred in the correlations of the comparison extracted parts corresponding to both the reference extracted parts.

9. The filtering device of claim 8, wherein
the positional relationship information deriving module derives a relative position of the comparison extracted part with respect to the reference extracted part; and
when the difference between the relative position of the comparison extracted part having the second highest correlation to the one reference extracted part and the relative position of the comparison extracted part having the second highest correlation to the other reference extracted part is less than a predetermined amount, the positional relationship replacing module mutually replaces the correlation of each comparison extracted part corresponding to both the reference extracted parts.

10. The filtering device of claim 8, wherein
the positional relationship information deriving module derives a relative position of the comparison extracted part with respect to the reference extracted part; and
when the difference between the relative position of the comparison extracted part having the highest correlation to the one reference extracted part is and the relative position of the comparison extracted part having the highest correlation to the other reference extracted part is less than a predetermined amount, the positional relationship replacing module determines that the correlation of each comparison extracted part corresponding to both the reference extracted parts is correct.

11. The filtering device of claim 9, wherein
the positional relationship information deriving module derives a relative position of the comparison extracted part with respect to the reference extracted part; and
when the difference between the relative position of the comparison extracted part having the highest correlation to the one reference extracted part is and the relative position of the comparison extracted part having the highest correlation to the other reference extracted part is less than a predetermined amount, the positional relationship replacing module determines that the correlation of each comparison extracted part corresponding to both the reference extracted parts is correct.

12. The filtering device of claim 8, wherein the positional relationship information deriving module derives a relative position of the comparison extracted part with respect to the reference extracted part; and
when the relative position of the comparison extracted part having the second highest correlation to the one reference extracted part is not substantially identical to the relative position of the comparison extracted part having the second highest correlation to the other reference extracted part, and the relative position of the comparison extracted part having the highest correlation to the one reference extracted part is not substantially identical to the relative position of the comparison extracted part having the highest correlation to the other reference extracted part, the positional relationship replacing module validates the relative position of one of the two reference extracted parts of which the relative position becomes the minimum, and invalidates the relative position of the other reference extracted part of which the relative position does not become the minimum.

13. The filtering device of claim 9, wherein the positional relationship information deriving module derives a relative position of the comparison extracted part with respect to the reference extracted part; and
when the difference between the relative position of the comparison extracted part having the second highest correlation to the one reference extracted part and the relative position of the comparison extracted part having the second highest correlation to the other reference extracted part is not less than a predetermined amount, and the difference between the relative position of the comparison extracted part having the highest correlation to the one reference extracted part and the relative position of the comparison extracted part having the highest correlation to the other reference extracted part is not less than a predetermined amount, the positional relationship replacing module validates the relative position of one of the two reference extracted parts of which the relative position becomes the minimum, and invalidates the relative position of the other reference extracted part of which the relative position does not become the minimum.

14. The filtering device of claim 10, wherein the positional relationship information deriving module derives a relative position of the comparison extracted part with respect to the reference extracted part; and when the difference between the relative position of the comparison extracted part having the second highest correlation to the one reference extracted part and the relative position of the comparison extracted part having the second highest correlation to the other reference extracted part is not less than a predetermined amount, and the difference between the relative position of the comparison extracted part having the highest correlation to the one reference extracted part and the relative position of the comparison extracted part having the highest correlation to the other reference extracted part is not less than a predetermined amount, the positional relationship replacing module validates the relative position of one of the two reference extracted parts of which the relative position becomes the minimum, and invalidates the relative position of the other reference extracted part of which the relative position does not become the minimum.

15. The filtering device of claim 11, wherein the positional relationship information deriving module derives a relative position of the comparison extracted part with respect to the reference extracted part; and when the difference between the relative position of the comparison extracted part having the second highest correlation to the one reference extracted part and the relative position of the comparison extracted part having the second highest correlation to the other reference extracted part is not less than a predetermined amount, and the difference between the relative position of the comparison extracted part having the highest correlation to the one reference extracted part and the relative position of the comparison extracted part having the highest correlation to the other reference extracted part is not less than a predetermined amount, the positional relationship replacing module validates the relative position of one of the two reference extracted parts of which the relative position becomes the minimum, and invalidates the relative position of the other reference extracted part of which the relative position does not become the minimum.

16. The filtering device of claim 1, wherein the filtering device is applied to a stereo imaging system that generates a pair of images having mutual relevance; and the pair of comparison targets is comprised of a reference image imaged by one of cameras of the stereo imaging system and a comparison image imaged by the other camera.

17. The filtering device of claim 1, wherein the filtering device is applied to a monocular imaging device having a monocular camera, and the pair of comparison targets is comprised of a pair of images imaged at different timings.

18. The filtering device of claim 1, wherein the filtering device is applied to a monocular imaging device having a monocular camera, and the pair of comparison targets is comprised of an image captured by the monocular camera and a template image.

19. A filtering device, comprising:
one or more processors, configured to:
derive, per a pair of comparison targets having mutual relevance, multiple evaluation values indicative of correlations between any one of reference extracted parts extracted from one of the comparison targets and multiple comparison extracted parts extracted from the other comparison target;
for each of at least two of the reference extracted parts:
derive positional relationships for a predetermined number of the multiple comparison extracted parts having the highest correlations with the reference extracted part,
order, in terms of correlation, the predetermined number of positional relationships for the reference extracted part, and
identify a positional relationship for a comparison extracted part having a highest correlation to the reference extracted part as a candidate for determining a correct correlation for that reference extracted part;
determine whether the difference between a first position of a reference extracted part candidate for determining a correct correlation for a first reference extracted part and a second position of a candidate for determining a correct correlation for a second reference extracted part is less than a predetermined amount;
when it is determined that a difference between the first position and the second position is less than the predetermined amount, replace the positional relationship identified as a candidate for determining the correct correlation for one of the first or second reference extracted parts with a positional relationship for a comparison extracted part having a second highest correlation to the one of the first or second reference extracted part.

* * * * *